(12) United States Patent
Kim et al.

(10) Patent No.: US 12,709,131 B2
(45) Date of Patent: Aug. 18, 2026

(54) VEHICLE HEAT PUMP SYSTEM

(71) Applicant: Hanon Systems, Daejeon (KR)

(72) Inventors: Moo Joong Kim, Daejeon (KR); Hyeong Kyu Jin, Daejeon (KR); Hae Jun Lee, Daejeon (KR); Sung Je Lee, Daejeon (KR); Dong Woo Hwang, Daejeon (KR); In Guk Hwang, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 177 days.

(21) Appl. No.: 18/749,718

(22) Filed: Jun. 21, 2024

(65) Prior Publication Data

US 2024/0351394 A1 Oct. 24, 2024

Related U.S. Application Data

(62) Division of application No. 17/780,246, filed as application No. PCT/KR2020/017353 on Dec. 1, 2020, now Pat. No. 12,397,610.

(30) Foreign Application Priority Data

Dec. 4, 2019 (KR) ........................ 10-2019-0160086
Dec. 4, 2019 (KR) ........................ 10-2019-0160087
Nov. 23, 2020 (KR) ........................ 10-2020-0157731

(51) Int. Cl.
*B60H 1/00* (2006.01)
*B60H 1/03* (2006.01)

(52) U.S. Cl.
CPC ..... *B60H 1/00342* (2013.01); *B60H 1/00278* (2013.01); *B60H 1/03* (2013.01); *B60H 2001/00307* (2013.01)

(58) Field of Classification Search
CPC .. B60H 1/00342; B60H 1/00278; B60H 1/03; B60H 1/00921; B60H 1/32284; B60H 2001/00307; B60H 2001/00928
See application file for complete search history.

(56) References Cited

U.S. PATENT DOCUMENTS

2017/0174038 A1 6/2017 Scheldel et al.
2019/0061470 A1* 2/2019 Koberstein ........ B60H 1/00392

FOREIGN PATENT DOCUMENTS

DE 102012108043 A1 5/2014
DE 112013000832 T5 10/2014
(Continued)

OTHER PUBLICATIONS

Office Action issued on Oct. 10, 2024 by the KIPO in the corresponding Patent Application No. 10-2020-0157731, with English translation.

(Continued)

*Primary Examiner* — Joseph F Trpisovsky
(74) *Attorney, Agent, or Firm* — NORTON ROSE FULBRIGHT US LLP

(57) ABSTRACT

An embodiment of the present invention provides a vehicle heat pump system including a compressor configured to compress and circulate a refrigerant, a condenser configured to condense the compressed refrigerant, a first expansion valve configured to expand the condensed refrigerant, an evaporator configured to evaporate the refrigerant expanded by the first expansion valve by allowing the refrigerant to exchange heat with a coolant, a cabin cooler configured to cool a vehicle interior by allowing the coolant having passed through the evaporator to exchange heat with air, and a radiator configured to allow the coolant for cooling an electrical component to exchange heat with outside air, in (Continued)

which the coolant having passed through the radiator flows into the evaporator in a heating mode.

8 Claims, 25 Drawing Sheets

(56) References Cited

FOREIGN PATENT DOCUMENTS

| | | | |
|---|---|---|---|
| JP | 2009280020 | A | 12/2009 |
| KR | 2003-0026616 | A | 4/2003 |
| KR | 101283592 | B1 | 7/2013 |
| KR | 101811762 | B1 | 12/2017 |
| KR | 20190081317 | A | 7/2019 |
| KR | 20190124931 | A | 11/2019 |
| KR | 20190132733 | A | 11/2019 |
| KR | 2020-0078000 | A | 7/2020 |

OTHER PUBLICATIONS

Office Action issued on Feb. 15, 2023 by the KIPO in the corresponding Patent Application No. 10-2019-0160087, with English translation.

Office Action issued on Feb. 15, 2023 by the KIPO in the corresponding Patent Application No. 10-2019-0160086, with English translation.

English Translation of Official Action issued Jan. 29, 2025 in related German Patent Application No. 112020005910.3, 12 pgs.

* cited by examiner

FIG. 1

VEHICLE HEAT PUMP SYSTEM

CROSS-REFERENCE TO RELATED APPLICATIONS

This application is a division of U.S. patent application Ser. No. 17/780,246 filed on May 26, 2022, pending, which is a national phase under 35 U.S.C. § 371 of International Application No. PCT/KR2020/017353 filed on Dec. 1, 2020, which claims the benefit of priority from Korean Patent Application Nos. 10-2019-0160086 filed on Dec. 4, 2019, 10-2019-0160087filed on Dec. 4, 2019 and 10-2020-0157731 filed on Nov. 23, 2020. The entire contents of these applications are incorporated herein by reference in their entirety.

TECHNICAL FIELD

An embodiment relates to a vehicle heat pump system.

BACKGROUND ART

As development and research have been conducted on environmental-friendly technologies and alternative energy sources for replacing fossil raw materials, and electric vehicles and hybrid vehicles have been considered as most attractive fields in recent vehicle industries. Batteries are mounted in the electric vehicles and hybrid vehicles to provide driving power. The power of the battery is used not only to drive the vehicle, but also to cool or heat a vehicle interior.

When the battery is used as a heat source for cooling or heating the interior of the vehicle that provides driving power by using the battery, the traveling distance decreases to that extent. To solve this problem, a method of applying a heat pump system, which has been widely used as a domestic cooling or heating device in the related art, to the vehicle has been proposed.

For reference, the heat pump refers to a process of absorbing low-temperature heat and transferring the absorbed heat to a high-temperature location. For example, the heat pump implements a cycle in which a liquid refrigerant becomes a gaseous refrigerant by evaporating in an evaporator and absorbing heat from the surrounding, and the gaseous refrigerant becomes the liquid refrigerant by dissipating heat to the surrounding by means of a condenser. The application of the heat pump to the electric or hybrid vehicle may advantageously ensure an insufficient heat source in a general air conditioning casing in the related art.

FIG. 1 is a view illustrating a structure of a secondary loop cooling system of a vehicle heat pump system in the related art.

Referring to FIG. 1, a vehicle heat pump system in the related art performs cooling and heating by using a refrigerant circulation line circulating through a compressor 10, a condenser 20, an expansion valve 30, and a chiller 40, and a coolant circulation line that exchanges heat with a refrigerant passing through the chiller 40.

However, there is a problem in that the secondary loop cooling system has lower cooling performance than a direct cooling system. Because the secondary loop cooling system primarily cools a coolant and then cools a vehicle interior by cooling air with the coolant without directly cooling the air, there is a problem in that efficiency deteriorates.

DISCLOSURE

Technical Problem

An object of the embodiment is to improve heating performance by absorbing heat of outside air in an evaporator by means of a radiator.

Another object of the embodiment is to improve heating performance by selectively using outside air, waste heat of an electrical component, and waste heat of a battery as heat absorbing sources.

Still another object of the embodiment is to simplify a refrigerant circuit by using a secondary loop and ensure price competitiveness by reducing the number of heat exchangers and refrigerant valves.

Yet another object of the embodiment is to configure a coolant circulation line in which a coolant may flow through a radiator and an electrical component in series.

Still yet another object of the embodiment is to improve heating performance by allowing a coolant to flow at a constant flow rate in a coolant circulation line by using the structure.

Technical problems to be solved by the present invention are not limited to the above-mentioned technical problems, and other technical problems, which are not mentioned above, may be clearly understood by those skilled in the art from the following descriptions.

Technical Solution

An embodiment of the present invention provides a vehicle heat pump system including: a compressor configured to compress and circulate a refrigerant; a condenser configured to condense the compressed refrigerant; a first expansion valve configured to expand the condensed refrigerant; an evaporator configured to evaporate the refrigerant expanded by the first expansion valve by allowing the refrigerant to exchange heat with a coolant; a cabin cooler configured to cool a vehicle interior by allowing the coolant having passed through the evaporator to exchange heat with air; and a radiator configured to allow the coolant for cooling an electrical component to exchange heat with outside air, in which the coolant having passed through the radiator flows into the evaporator in a heating mode.

In particular, the vehicle heat pump system may further include: a heating line configured to heat the vehicle interior by circulating the coolant that exchanges heat with the refrigerant through the condenser; and a refrigerating line configured to cool a battery and the electrical component by circulating the coolant that exchanges heat with air or the refrigerant.

In particular, a third coolant joint and a fifth coolant joint may be disposed in the refrigerating line, such that a fifth refrigerating line circulating through the radiator and the evaporator is defined.

In particular, the fifth refrigerating line may be connected to a cooling line configured to cool the vehicle interior by circulating the coolant that exchanges heat with the refrigerant through the evaporator, and the cabin cooler may be disposed in the cooling line.

In particular, a fourth coolant joint configured to connect the cooling line may be disposed in the fifth refrigerating line, and a fifth direction switching valve configured to determine whether to circulate the coolant to the cooling line may be disposed in the fifth refrigerating line.

In particular, the cooling line may include a third pump connected between the evaporator and the cabin cooler, and the third pump may be disposed between the fourth coolant joint and the evaporator.

In particular, the vehicle heat pump system may include: a first connection line branching off from one side of the refrigerating line and connected to the heating line; and a second connection line branching off from the other side of the refrigerating line and connected to the heating line.

In particular, the first connection line, the second connection line, and the heating line may be connected to a second direction switching valve, and the refrigerating line and the heating line may be connected to or disconnected from each other by the second direction switching valve.

In particular, the electrical component may be disposed in the second connection line, and a third connection line branching off from a first coolant joint disposed in the refrigerating line may be disposed to pass through the chiller.

In particular, a fourth direction switching valve may be disposed in the second connection line and control a flow direction of the coolant having passed through the electrical component, the fourth direction switching valve may be connected to a third coolant joint of the third connection line through a fourth connection line, and the third coolant joint may be disposed at a side adjacent to an inlet of the chiller.

In particular, the refrigerant having passed through the condenser may include a first refrigerant line branching off from one side of the refrigerant branch part and passing through the first expansion valve and the evaporator, and a second refrigerant line branching off from the other side of the refrigerant branch part and passing through the second expansion valve and the chiller.

In particular, a refrigerant heat exchanger may be disposed in the first refrigerant line, the refrigerant heat exchanger may be disposed between the refrigerant branch part and the first expansion valve, and the refrigerant introduced into the first expansion valve and the refrigerant having passed through the evaporator may exchange heat with each other.

In particular, the heating line may include: a heater core configured to heat the vehicle interior by using air heated as the air introduced into the vehicle interior exchanges heat with the coolant that exchanges heat with the refrigerant through the condenser; and a coolant heater disposed forward of the heater core based on the flow direction of the coolant and configured to heat the coolant.

In particular, in the heating mode, the fifth direction switching valve may close a flow path of the cooling line.

In particular, the fourth direction switching valve controls the direction of the coolant so that the coolant, which absorbs heat from the radiator and the electrical component, passes through the chiller.

In particular, in the cooling mode, the fifth direction switching valve may circulate the cooling line in a closed loop.

In particular, the vehicle heat pump system may include: a refrigerant circulation line in which the compressor, the condenser, the evaporator, and a chiller are disposed and the refrigerant circulates; a refrigerating line configured to cool a battery by circulating the coolant that exchanges heat with air or the refrigerant; a cooling line in which the cabin cooler is disposed, the cooling line being configured to cool the vehicle interior by using the coolant passing through the evaporator; and a cooling connection line configured to connect the cooling line and the refrigerating line, the refrigerating line and the cooling line may be connected by a first direction switching valve, and the refrigerating line and the cooling line may be separated and connected depending on an air conditioning mode.

In particular, one side of the cooling connection line may be disposed between the evaporator and the cabin cooler.

In particular, the refrigerant circulation line may include the compressor, the condenser, the refrigerant branch part, a first refrigerant line branching off from the refrigerant branch part toward one side and configured such that the first expansion valve and the evaporator are disposed therein, a second refrigerant line branching off from the refrigerant branch part toward the other side and configured such that the second expansion valve and the chiller are disposed therein, and an accumulator through which the refrigerant having passed through the first refrigerant line and the second refrigerant line passes.

In particular, the refrigerant circulation line may further include a refrigerant heat exchanger in which the refrigerant passing through the condenser and the refrigerant passing through the accumulator exchange heat with each other.

In particular, the vehicle heat pump system may further include a heating line configured to heat the vehicle interior by circulating the coolant that exchanges heat with the refrigerant through the condenser.

In particular, the vehicle heat pump system may include: a first connection line branching off from one side of the refrigerating line and connected to the heating line; and a second connection line branching off from the other side of the refrigerating line and connected to the heating line.

In particular, the first connection line, the second connection line, and the heating line may be connected to a second direction switching valve, and the refrigerating line and the heating line may be connected to or disconnected from each other by the second direction switching valve.

In particular, the electrical component may be disposed in the first connection line.

In particular, a third connection line branching off from a first coolant joint disposed in the refrigerating line may be disposed to pass through the chiller, and a third direction switching valve connected to the refrigerating line may be disposed in the third connection line.

In particular, the third connection line may be disposed in parallel with the refrigerating line in which the battery is disposed.

In particular, a reservoir tank may be disposed at a connection portion between the first connection line and the refrigerating line.

In particular, when the air conditioning mode is the heating mode, one region of the refrigerating line and one region of the cooling line may be connected by the operation of the first direction switching valve, such that the coolant may circulate.

In particular, the battery may be disposed in the third connection line, a fourth connection line may be disposed between the battery and the chiller, one side of the fourth connection line may be connected to the second connection line, the other side of the fourth connection line may be connected to the third connection line, and a fourth direction switching valve may be disposed in a region in which the second connection line and the fourth connection line are connected.

In particular, the vehicle heat pump system may include: a second expansion valve configured to expand the condensed refrigerant; a chiller configured to allow the refrigerant expanded by the second expansion valve to exchange heat with the coolant; and the electrical component configured to be cooled by the coolant, and in the heating mode, the coolant having passed through the radiator may exchange heat with the electrical component and then flow into the chiller.

In particular, the vehicle heat pump system may further include: a heating line configured to heat the vehicle interior by circulating the coolant that exchanges heat with the refrigerant through a first heat exchanger; and a refrigerating line configured to cool a heat generating component and the electrical component by circulating the coolant that exchanges heat with air or the refrigerant.

In particular, the vehicle heat pump system may include: a first connection line branching off from one side of the refrigerating line and connected to the heating line; and a second connection line branching off from the other side of the refrigerating line and connected to the heating line.

In particular, the first connection line, the second connection line, and the heating line may be connected to a second direction switching valve, and the refrigerating line and the heating line may be connected to or disconnected from each other by the second direction switching valve.

In particular, the electrical component may be disposed in the second connection line, and a third connection line branching off from a first coolant joint disposed in the refrigerating line may be disposed to pass through the chiller.

In particular, a fourth direction switching valve may be disposed in the second connection line and control a flow direction of the coolant having passed through the electrical component, the fourth direction switching valve may be connected to a third coolant joint of the third connection line through a fourth connection line, and the third coolant joint may be disposed at a side adjacent to an inlet of the chiller.

In particular, the first coolant joint and the third coolant joint may be integrated and have four branch lines.

In particular, the vehicle heat pump system may further include a second cooling line configured to cool the vehicle interior by circulating the coolant that exchanges heat with the refrigerant through the second heat exchanger.

In particular, the second cooling line may include: a cabin cooler configured to cool the vehicle interior by using air cooled as the air introduced into the vehicle interior exchanges heat with the refrigerant through the second heat exchanger; and a third pump connected between the second heat exchanger and the cabin cooler, and a coolant line connected to the second heat exchanger, the third pump, and the cabin cooler may define a closed loop.

In particular, the vehicle heat pump system may further include an air conditioning device having an air blower configured to blow air into the vehicle interior, the second heat exchanger and the third pump may be disposed outside the air conditioning device, and the cabin cooler may be disposed inside the air conditioning device.

In particular, the refrigerant having passed through the first heat exchanger may include a first refrigerant line branching off from one side of the refrigerant branch part and passing through the first expansion valve and the second heat exchanger, and a second refrigerant line branching off from the other side of the refrigerant branch part and passing through the second expansion valve and the chiller.

In particular, a refrigerant heat exchanger may be disposed in the first refrigerant line, the refrigerant heat exchanger may be disposed between the refrigerant branch part and the first expansion valve, and the refrigerant introduced into the first expansion valve and the refrigerant having passed through the second heat exchanger may exchange heat with each other.

In particular, the heating line may include: a heater core configured to heat the vehicle interior by using air heated as the air introduced into the vehicle interior exchanges heat with the coolant that exchanges heat with the refrigerant through the first heat exchanger; and a coolant heater disposed forward of the heater core based on the flow direction of the coolant and configured to heat the coolant.

In particular, in the cooling mode, the heating line and the refrigerating line may be connected to each other.

In particular, the fourth direction switching valve may block the flow of the coolant into the chiller.

In particular, in the heating mode, the heating line and the refrigerating line may be separated from each other, and the coolant flowing along the refrigerating line may absorb heat while passing through the radiator and the electrical component and exchange heat with the refrigerant in the chiller.

Advantageous Effects

According to the embodiment, in the evaporator, the radiator may absorb heat of outside air, thereby improving heating performance.

In addition, the flow rate in the heat-absorbing cooling flow path may be increased by changing the position of the pump for cooling the vehicle interior, thereby improving heating performance.

In addition, outside air, waste heat of the electrical component, and waste heat of the battery may be selectively used as a heat absorbing source, thereby improving the heating performance according to the heating situation.

According to the embodiment, it is possible to simplify the refrigerant circuit by using the secondary loop and ensure price competitiveness by reducing the number of heat exchangers and refrigerant valves.

In addition, it is possible to implement various air conditioning modes by using the plurality of valve structures.

In addition, it is possible to heat the vehicle interior only by using waste heat of the electrical component and waste heat of the battery.

In addition, it is possible to increase the temperature of the battery while heating the vehicle interior.

In addition, it is possible to improve the heat-absorbing performance and heating performance by improving the structure of the system.

In addition, it is possible to improve the heating efficiency while implementing the cooling and heating circulation lines in the related art by improving the structure.

In addition, it is possible to improve the heating performance by improving the performance in absorbing waste heat of the electrical component. Further, it is possible to implement the maximum heating performance by using the structure capable of simultaneously absorbing heat of outside air and waste heat of the electrical component.

The various, beneficial advantages and effects of the present disclosure are not limited to the above-mentioned contents and may be more easily understood during the process of describing the specific embodiments of the present disclosure.

DESCRIPTION OF DRAWINGS

FIG. 1 is a view illustrating a structure of a secondary loop cooling system of a vehicle heat pump system in the related art according to a first embodiment of the present invention.

MODE FOR INVENTION

Figure 2:
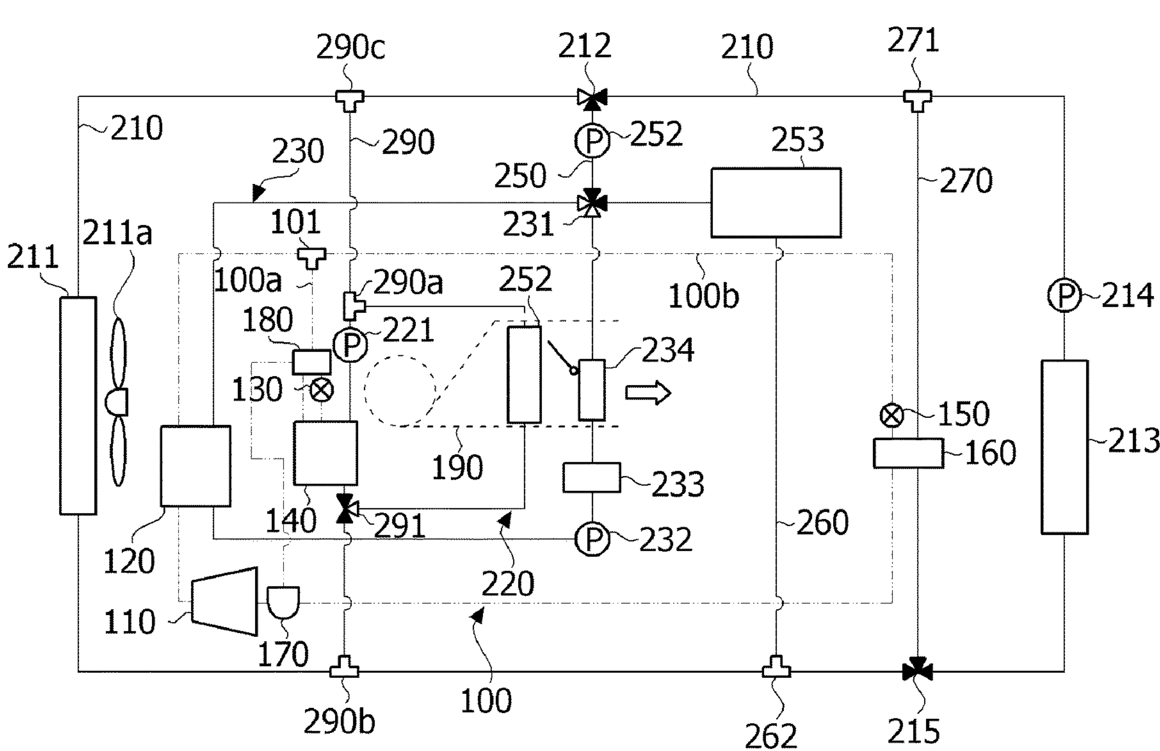
FIG. 2 is a structural view of a vehicle heat pump system according to an embodiment of the present invention.

Hereinafter, exemplary embodiments of the present invention will be described in detail with reference to the accompanying drawings.

However, the technical spirit of the present invention is not limited to some embodiments described herein but may be implemented in various different forms. One or more of the constituent elements in the embodiments may be selectively combined and substituted within the scope of the technical spirit of the present invention.

In addition, unless otherwise specifically and explicitly defined and stated, the terms (including technical and scientific terms) used in the embodiments of the present invention may be construed as the meaning which may be commonly understood by the person with ordinary skill in the art to which the present invention pertains. The meanings of the commonly used terms such as the terms defined in dictionaries may be interpreted in consideration of the contextual meanings of the related technology.

In addition, the terms used in the embodiments of the present invention are for explaining the embodiments, not for limiting the present invention.

In the present specification, unless particularly stated otherwise, a singular form may also include a plural form. The expression "at least one (or one or more) of A, B, and C" may include one or more of all combinations that can be made by combining A, B, and C.

In addition, the terms first, second, A, B, (a), and (b) may be used to describe constituent elements of the embodiments of the present invention.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "above (on) or below (under)" may include a meaning of a downward direction as well as an upward direction based on one constituent element.

Hereinafter, embodiments will be described in detail with reference to the accompanying drawings. The same or corresponding constituent elements are assigned with the same reference numerals regardless of reference numerals, and the repetitive description thereof will be omitted.

FIGS. 2 to 25 clearly illustrate only main features for conceptually and clearly understanding the present invention. As a result, various modifications of the drawings are expected, and the scope of the present invention need not be limited to particular shapes illustrated in the drawings.

FIGS. 2 to 6 illustrate a first embodiment of the present invention.

FIG. 2 is a structural view of a vehicle heat pump system according to an embodiment of the present invention.

Referring to FIG. 2, the vehicle heat pump system according to the embodiment of the present invention may include a refrigerant circulation line 100 configured to circulate a refrigerant and cool a vehicle interior; and a coolant circulation line 200 configured to circulate a coolant, heat the vehicle interior, and cool components. Further, the coolant circulation line 200 may include a heating line 230 configured to heat the vehicle interior, and a refrigerating line 210 configured to cool an electrical component 253 and a battery 213.

The refrigerant circulation line 100 may include a compressor 110, a condenser 120, a refrigerant branch part 101, a first refrigerant line **100*a* branching off from the refrigerant branch part 101 toward one side and configured to pass through a first expansion valve and an evaporator 140, a second refrigerant line 100*b* branching off from the refrigerant branch part 101 toward the other side and configured to pass through a second expansion valve and a chiller 160, and an accumulator 170 through which the refrigerant having passed through the first refrigerant line 100*a* and the second refrigerant line 100*b* passes. The refrigerant having passed through the accumulator 170 flows into the compressor 110** again, such that refrigerant circulation is implemented.

In this case, a refrigerant heat exchanger 180 may be disposed in the first refrigerant line 100*a*. The refrigerant heat exchanger 180 may be disposed between the refrigerant branch part 101 and the first expansion valve 130, such that the refrigerant introduced into the first expansion valve 130 may exchange heat with the refrigerant having passed through the evaporator 140.

The compressor 110 operates by receiving power from an engine (internal combustion engine) or a motor. The compressor 110 sucks the refrigerant, compresses the refrigerant into a high-temperature, high-pressure gaseous refrigerant, and then discharges the refrigerant to the condenser 120.

The condenser 120 serves as a condenser in both a cooling mode and a heating mode. The refrigerant flowing through the condenser 120 exchanges heat with the coolant in the coolant circulation line 200 to be described below and then flows to the first expansion valve 130. As described above, the coolant heated by the refrigerant in the condenser 120 may be supplied to an interior heat exchanger through the coolant circulation line 200. In one embodiment, a water-cooled condenser 120 may be used as the condenser 120.

The refrigerant branch part 101 distributes the refrigerant to the first refrigerant line 100*a* and the second refrigerant line 100*b*.

The first expansion valve 130 and the evaporator 140 may be disposed in the first refrigerant line 100*a*.

The first expansion valve 130 may throttle the refrigerant introduced from the first refrigerant line 100*a*, perform a bypass operation on the refrigerant, or block a flow of the refrigerant. The first expansion valve 130 may be disposed at a side adjacent to an inlet of the evaporator 140 based on a flow direction of the refrigerant.

The evaporator 140 is installed in an air conditioning casing and disposed in the first refrigerant line 100*a*. During a process in which the refrigerant discharged from the first expansion valve 130 is supplied to the evaporator 140 and air flowing in the air conditioning casing by a blower passes through the evaporator 140, the air exchanges heat with the low-temperature, low-pressure refrigerant in the evaporator 140 and is converted into cold air. The cold air is discharged into a vehicle interior and cools an occupant compartment.

The second expansion valve and the chiller 160 may be disposed in the second refrigerant line 100*b*.

The second expansion valve may throttle the refrigerant introduced from the second refrigerant line 100*b*, perform a bypass operation on the refrigerant, or block a flow of the refrigerant. The second expansion valve may be disposed at a side adjacent to an inlet of the chiller 160 based on the flow direction of the refrigerant.

The low-temperature, low-pressure refrigerant discharged from the second expansion valve is supplied to the chiller 160 and exchanges heat with the coolant flowing in the coolant circulation line 200. The cold coolant made by heat exchange in the chiller 160 may circulate through the coolant circulation line 200 and exchange heat with the high-temperature battery 213. That is, the battery 213 exchanges heat with the coolant instead of exchanging heat with the refrigerant.

The accumulator 170 is installed at a side adjacent to an inlet of the compressor 110. The refrigerant having passed through the evaporator 140 and/or the chiller 160 merges into the accumulator 170. The accumulator 170 may divide the refrigerant into a liquid refrigerant and a gaseous refrigerant and supply only the gaseous refrigerant to the compressor 110.

The refrigerant heat exchanger 180 allows the refrigerant introduced into the first expansion valve 130 and the refrigerant discharged from the evaporator 140 to exchange heat with each other, thereby improving cooling performance. In this case, an inlet side refrigerant line configured to connect the refrigerant branch part 101 and the first expansion valve 130 and configured such that the refrigerant is introduced into the evaporator 140 therethrough passes through the refrigerant heat exchanger 180, and an outlet side refrigerant line configured to connect the evaporator 140 and the accumulator 170 and configured such that the refrigerant is discharged from the evaporator 140 therethrough passes through the refrigerant heat exchanger 180, such that the refrigerant passing through the inlet side refrigerant line and the refrigerant passing through the outlet side refrigerant line may exchange heat with each other.

Therefore, before the refrigerant is introduced into the first expansion valve 130, the refrigerant may be further cooled by the refrigerant heat exchanger 180, thereby improving cooling performance implemented by the evaporator 140 and improving efficiency of the cooling system. In particular, the refrigerant heat exchanger 180 and the chiller 160 are connected in parallel.

That is, the refrigerant heat exchanger 180 is not disposed in series between the condenser 120 and the chiller 160 in the refrigerant line, but the refrigerant heat exchanger 180 is disposed adjacent to the evaporator 140, such that the refrigerant heat exchanger 180 and the evaporator 140 may be disposed and connected in series. If the refrigerant heat exchanger is disposed in series between the water-cooled condenser 120 and the chiller 160, the heating performance may decrease because a pressure drop occurs at a low-pressure side in the heating mode. On the contrary, when the refrigerant heat exchanger is connected in parallel, both the cooling performance and the heating performance increase. This is because there is no refrigerant heat exchanger between the condenser 120 and the chiller 160 in the flow of the refrigerant in the heating mode.

The coolant circulation line 200 may include the heating line 230 configured to heat the vehicle interior, and the refrigerating line 210 and a cooling line 220 configured to cool the electrical component 253 and the battery 213.

The heating line 230 may include the condenser 120, a second pump 232, a coolant heater 233, a heater core 234, and a second direction switching valve 231.

As described above, the refrigerant and the coolant may exchange heat with each other while passing through the condenser 120.

The second pump 232 is a means for pumping the coolant so that the coolant circulates along the heating line 230. The second pump 232 may be installed in the coolant line and disposed rearward of the condenser 120 based on the flow direction of the coolant.

The coolant heater 233 refers to a device for heating the coolant. The coolant heater 233 is connected and disposed rearward of the second pump 232 and forward of the heater core 234 based on the flow direction of the coolant. Further, the coolant heater 233 may operate when a temperature of the coolant is equal to or lower than a particular temperature. Various components such as an induction heater, a sheath heater, a PTC heater, or a film heater capable of generating heat using electric power may be used as the coolant heater 233.

The heater core 234 may be disposed in an air conditioning device 190 of the vehicle. The air flowing by the air blower may be heated while passing through the heater core 234, supplied to the vehicle interior, and used to heat the vehicle interior. Further, the heater core 234 may be connected and disposed rearward of the coolant heater 233 based on the flow direction of the coolant.

The second direction switching valve 231 may be installed between the heater core 234 and the condenser 120 and configured to selectively connect or disconnect the heating line 230 and the refrigerating line 210 to be described below.

More specifically, the second direction switching valve 231 may be installed in the heating line 230. Two coolant line pipes may be connected to the second direction switching valve 231. A single first connection line 250 branching off from one side of the refrigerating line 210 may be connected to the second direction switching valve 231. A single second connection line branching off from the other side of the refrigerating line 210 may be connected to the second direction switching valve 231. That is, four coolant lines may be connected to the second direction switching valve 231 so as to meet together. The second direction switching valve 231 may be a 4-way direction switching valve capable of adjusting states in which the four coolant lines are connected to or disconnected from one another.

The refrigerating line 210 may include a radiator 211, a first direction switching valve 212, a fourth pump 252, a second direction switching valve 231, the electrical component 253, a first coolant joint 271, a second coolant joint 262, a first pump 214, the battery 213, the chiller 160, and a third direction switching valve 215.

The radiator 211 cools the coolant having exchanged heat with the electrical component 253 or the battery 213. The radiator 211 may be cooled by a cooling fan 211*a* in an air-cooled manner.

The first direction switching valve 212 may be installed in the refrigerating line 210. Two coolant pipes may be connected to the first direction switching valve 212. The second direction switching valve 231 and the first direction switching valve 212 may be connected by the first connection line 250 so that the heating line 230 and the refrigerating line 210 are connected.

That is, three coolant lines may be connected to the first direction switching valve 212 so as to meet together. The first direction switching valve 212 may be a 3-way direction switching valve capable of adjusting states in which the three coolant lines are connected to or disconnected from one another.

The fourth pump 252 is a means for pumping the coolant so that the coolant circulates along the refrigerating line 210. Further, the fourth pump 252 is installed in the first connection line 250 and disposed between the second direction switching valve 231 and the first direction switching valve 212. The operation of the fourth pump 252 may allow the coolant to flow from the first direction switching valve 212 to the second direction switching valve 231.

The second direction switching valve 231 is as described above with reference to the heating line 230.

The electrical component 253 is disposed in a second connection line 260 that connects the second direction switching valve 231 and the second coolant joint 262. The electrical component 253 may be cooled by the coolant. Further, the electrical component 253 may be a drive motor, an inverter, a charger (onboard charger (OBC)), or the like.

The first pump 214 is a means for pumping the coolant so that the coolant circulates along the refrigerating line 210. Further, the first pump 214 is installed in the coolant line and disposed between the first coolant joint 271 and the battery 213, such that the coolant may flow from the first pump 214 to the battery 213.

The battery 213 serves as a power source for the vehicle. The battery 213 may serve as a driving source for various types of electrical components 253 in the vehicle. In addition, the battery 213 may be connected to a fuel cell and serve to store electricity. Alternatively, the battery 213 may serve to store electricity supplied from the outside. Further, the battery 213 may be disposed in the coolant line and provided between the first pump 214 and the third direction switching valve 215. Therefore, the battery 213 may be cooled or heated by exchanging heat with the flowing coolant.

The first coolant joint 271 is installed in the coolant line and disposed rearward of the first direction switching valve 212 based on the flow direction of the coolant. Three coolant lines are connected to the first coolant joint 271 so as to meet together. That is, the first coolant joint 271 may be installed such that two opposite sides thereof are connected to the refrigerating line 210, and a third connection line 270 may be connected to a lower side of the first coolant joint 271. In this case, the third connection line 270 may be connected to pass through the chiller 160.

The second coolant joint 262 may be installed at a point at which a rear end of the second connection line 260 meets the refrigerating line 210. Three coolant lines are connected to the second coolant joint 262 so as to meet together. That is, the second coolant joint 262 may be installed such that two opposite sides thereof are connected to the refrigerating line 210, and the second connection line 260 may be connected to an upper side of the second coolant joint 262.

The chiller 160 is as described above with reference to the heating line 230.

The third direction switching valve 215 may be installed in the coolant line and disposed between the battery 213 and the second coolant joint 262. Two coolant pipes may be connected to the third direction switching valve 215. The third connection line 270 may be connected to an upper side of the third direction switching valve 215, such that the battery 213 and the third connection line 270 may be connected in parallel. In this case, the first direction switching valve 212 may be a 3-way direction switching valve capable of adjusting states in which the three coolant lines are connected to or disconnected from one another.

Further, the air blower may be installed at one side of the air conditioning device 190 to blow air. A temperature adjustment door may be installed in the air conditioning device 190. In addition, the evaporator 140 and the heater core 234 disposed in the air conditioning device 190 may be disposed and configured such that on the basis of the operation of the temperature adjustment door, the air discharged from the air blower may flow into the vehicle interior while passing only through the evaporator 140 or flow into the vehicle interior while passing through the evaporator 140 and then passing through the heater core 234.

The fifth connection line 290 may be disposed in the refrigerating line 210. The fifth connection line 290 may connect a sixth coolant joint 290*c* and a fifth coolant joint 290*b*, the sixth coolant joint 290*c* may be disposed between the radiator 211 and the first direction switching valve 212, and the fifth coolant joint 290*b* may be disposed between the radiator 211 and the second coolant joint 262.

The fifth connection line 290 may be disposed to pass through the evaporator 140. The coolant having passed through the radiator 211 may circulate through the evaporator 140 according to the air conditioning mode.

In the fifth connection line 290, a fourth coolant joint 290*a* may be disposed at a side adjacent to an inlet of the evaporator 140, and a fifth direction switching valve 291 may be disposed at a side adjacent to an outlet of the evaporator 140.

The cooling line 220 may be connected to the fourth coolant joint 290*a* and the fifth direction switching valve 291.

The cooling line 220 may include the evaporator 140, a cabin cooler 222, and a third pump 221. In this case, the coolant line, which connects the evaporator 140, the cabin cooler 222, and the third pump 221 may define a closed loop according to the operation of the fifth direction switching valve 291.

As described above, the refrigerant and the coolant may exchange heat with each other while passing through the evaporator 140.

The cabin cooler 222 serves as an air-cooled evaporator 140. The coolant cooled by exchanging heat with the refrigerant passing through the evaporator 140 passes through the cabin cooler 222. Further, the cabin cooler 222 is disposed in the air conditioning device 190. The air flowing by the air blower of the air conditioning device 190 is cooled while passing through the cabin cooler 222, supplied to the vehicle interior, and used to cool the vehicle interior.

The third pump 221 serves to pump the coolant so that the coolant circulates along the cooling line 220. Further, the third pump 221 is installed in the fifth connection line 290 and disposed between the evaporator 140 and the fourth coolant joint 290*a*. The operation of the third pump 221 may circulate the coolant.

Therefore, the vehicle heat pump system according to the present invention adopts the cooling line 220 using the coolant for cooling the vehicle interior, such that the refrigerant circulation line 100 through which the refrigerant circulates may be disposed outside the vehicle interior instead of being disposed in the vehicle interior. Therefore, it is possible to reduce a length of the refrigerant pipe, reduce the amount of refrigerant, and modularize the components in the refrigerant circulation line 100. In addition, a high-efficiency natural refrigerant may be used as the refrigerant used for the refrigerant circulation line 100, which may improve the efficiency of the thermal management system.

Figure 3:
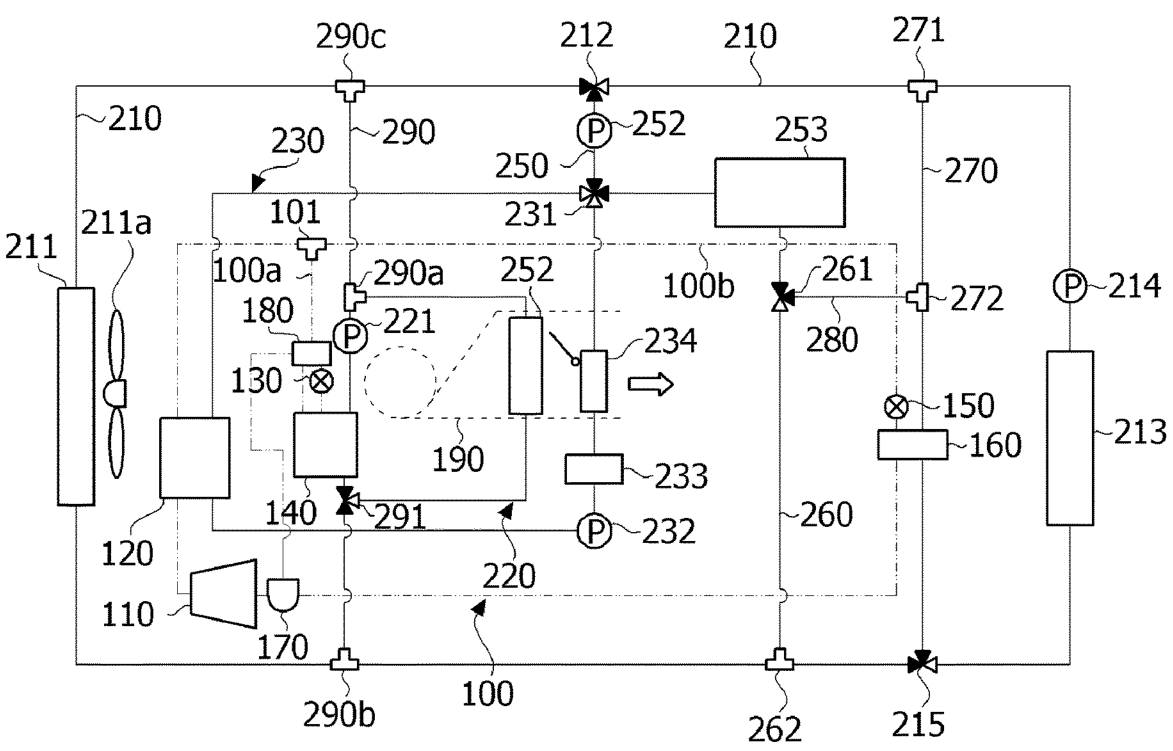
FIG. 3 is a view illustrating a first embodiment of FIG. 2.

FIG. 3 is a view illustrating a first embodiment of FIG. 2. FIG. 3 is a view illustrating a structure in which a fourth connection line is disposed in FIG. 2.

Referring to FIG. 3, a fourth direction switching valve 261 may be disposed in the second connection line 260 and control a flow direction of the coolant having passed through the electrical component 253. The fourth direction switching valve 261 is disposed in the fourth connection line 280 branching off from the second connection line 260. The fourth connection line 280 may be connected to a third coolant joint 272 disposed in the third connection line 270.

The third coolant joint 272 is disposed at a side adjacent to an inlet of the chiller 160 through which the coolant is introduced. The coolant having passed through the electrical component 253 may be introduced into the chiller 160 according to the operation of the fourth direction switching valve 261.

In one embodiment, when the upper side and the right side of the fourth direction switching valve 261 are connected, the electrical component 253 and the chiller 160 may be connected in series.

Figure 4:
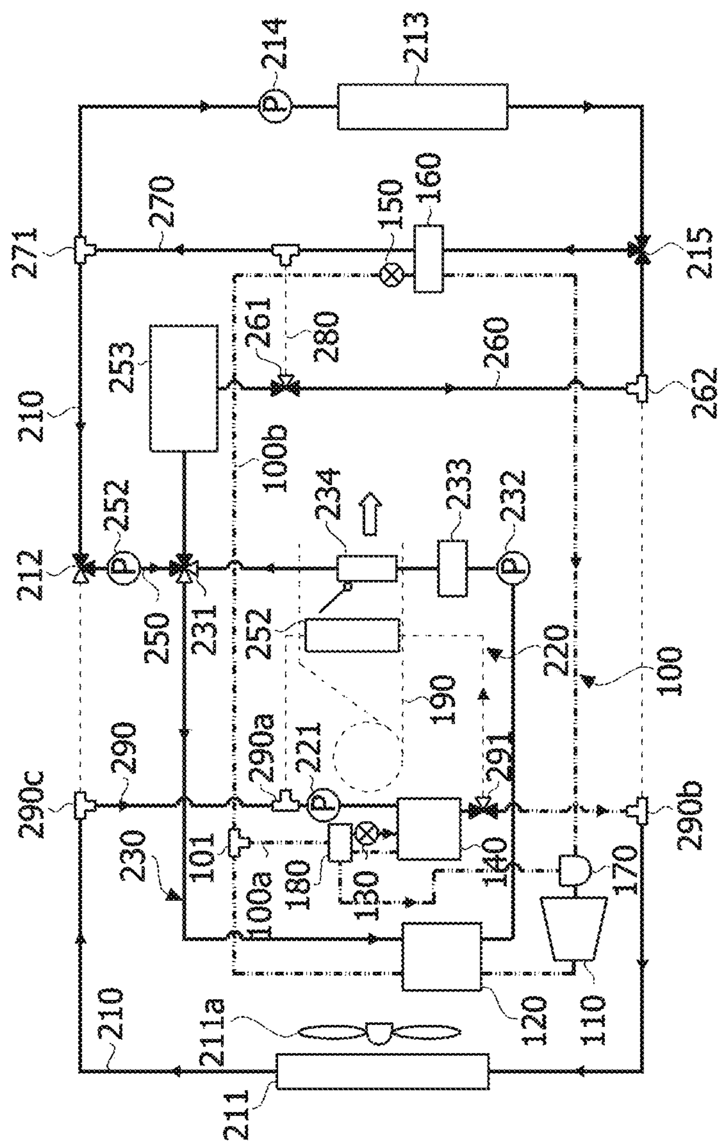
FIG. 4 is a view illustrating an operating state of the system in a heating mode in FIG. 2.

FIG. 4 is a view illustrating an operating state of the system in a heating mode in FIG. 2.

Referring to FIG. 4, in the refrigerant circulation line 100, the compressor 110 operates, and the high-temperature, high-pressure refrigerant is discharged from the compressor 110. Further, the refrigerant discharged from the compressor 110 is cooled while exchanging heat with the coolant in the condenser 120. Thereafter, the refrigerant cooled and condensed in the condenser 120 is divided in the refrigerant branch part 101. A part of the refrigerant passes through the refrigerant heat exchanger 180 and then be throttled and expanded while passing through the first expansion valve 130. Thereafter, the expanded refrigerant exchanges heat with the coolant in a secondary cooling line 250 while passing through the evaporator 140, and the coolant in the secondary cooling line 250 is cooled by the refrigerant.

Further, the refrigerant evaporated in the evaporator 140 passes through the refrigerant heat exchanger 180, exchanges heat with the refrigerant before the refrigerant is introduced into the first expansion valve 130, and then flows into the compressor 110 again via the accumulator 170.

In addition, the remaining part of refrigerant divided in the refrigerant branch part 101 is throttled and expanded while passing through the second expansion valve 150. Thereafter, the expanded refrigerant is evaporated by exchanging heat with the coolant while passing through the chiller 160, such that the coolant may be cooled. Further, the refrigerant evaporated in the chiller 160 flows into the compressor 110 again via the accumulator 170.

As described above, the refrigerant having passed through the evaporator 140 and the refrigerant having passed through the chiller 160 merge with each other in the accumulator 170 and flow into the compressor 110. The refrigerant circulates as the above-mentioned process is repeated.

Meanwhile, the coolant in the coolant circulation line 200 is circulated by the operations of the second pump 232, the fourth pump 252, the first pump 214, and the third pump 221. Further, the coolant may be heated while passing through the condenser 120, heated by the coolant heater 212, and heated by waste heat of the electrical component 253. The coolant may be cooled while passing through the chiller 160. In this case, the second direction switching valve 231 and the first direction switching valve 212 may adjust the directions thereof so that the heating line 230 and the refrigerating line 210 are separated.

More specifically, the coolant may flow as the upper side and the right side of the second direction switching valve 231 are connected to each other, and the coolant may flow as the lower side and the left side of the second direction switching valve 231 are connected to each other. Further, when the right side and the lower side of the first direction switching valve 212 are connected to each other, the coolant may flow, and the left side of the first direction switching valve 212 may be disconnected.

In addition, all the upper side, the left side, and the right side of the third direction switching valve 215 may be opened.

Therefore, the coolant in the heating line 230 sequentially passes through the second pump 232, the coolant heater 212, the heater core 234, the second direction switching valve 231, and the condenser 120, flows into the second pump 232 again, and circulates. This cycle is repeated.

In this case, the coolant passes through the heater core 234 while exchanging heat with the air blown by the air blower of the air conditioning device 190, such that the air is heat. The heated air is supplied to the vehicle interior and used to heat the vehicle interior.

Further, the coolant in the refrigerating line 210 separated from the heating line 230 flows from the fourth pump 252 sequentially to the second direction switching valve 231, the electrical component 253, the second coolant joint 262, the third direction switching valve 215, the chiller 160, the first coolant joint 271, and the first direction switching valve 212, flows into the fourth pump 252 again, and circulates. This cycle is repeated.

In addition, the coolant having passed through the battery 213 may circulate through the first pump 214, merge into the third direction switching valve 215, flows upward, and then be divided into two pieces in the first coolant joint 271.

In this case, the left side of the first direction switching valve 212 is blocked, and a separate coolant circulation line may be formed by the third pump 221.

The coolant having passed through the radiator 211 may be circulated downward from the third coolant joint 215 by the third pump 221, such that a circulation line in which the coolant passes through the evaporator 140 and the fifth coolant joint **290*b* and then flows into the radiator 211 again may be defined. Therefore, in the evaporator 140, the coolant may absorb heat from outside air by means of the radiator 211. In addition, the third pump 221 may be disposed in the fifth connection line 290** to increase a flow rate in a heat absorbing coolant path, thereby improving heating performance.

In this case, the upper side and the lower side of the fifth direction switching valve 291 connected to the fifth connection line 290 are connected, and the right side of the fifth direction switching valve 291 is blocked, thereby preventing the coolant from circulating to the cooling line 220.

Figure 5:
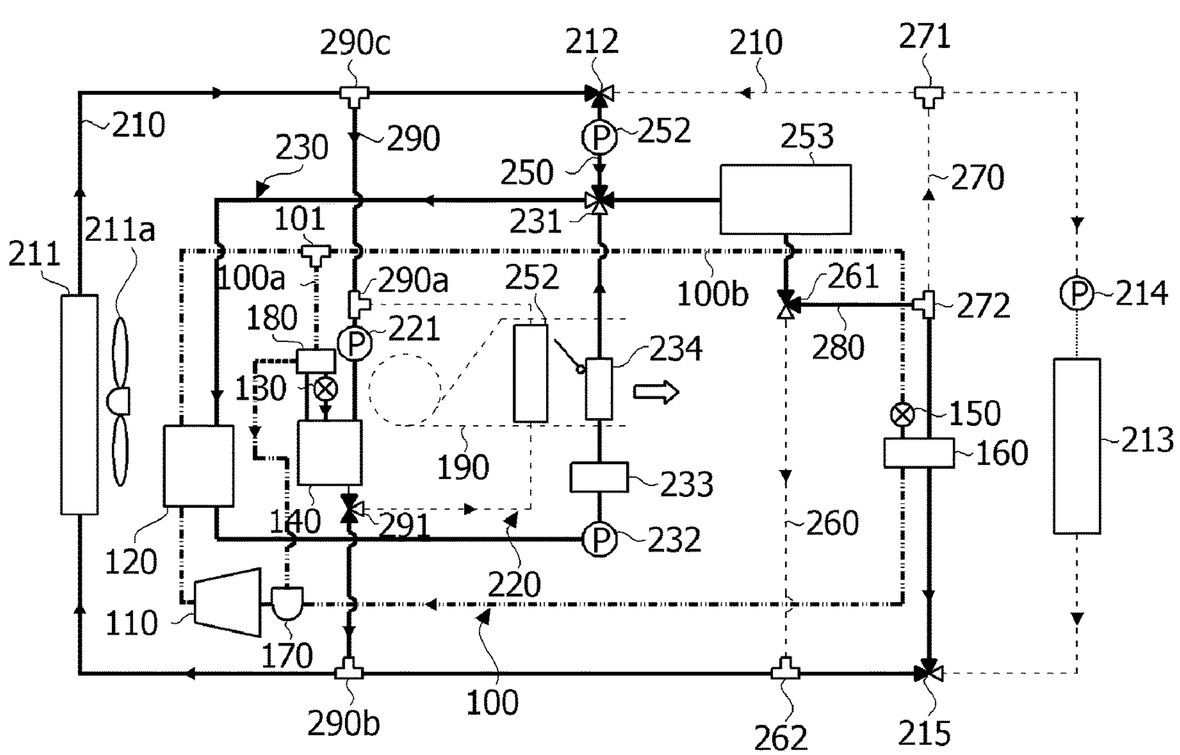
FIG. 5 is a view illustrating an operating state of the system in a heating mode in FIG. 3.

FIG. 5 is a view illustrating an operating state of the system in a heating mode in FIG. 3.

Referring to FIG. 5, in the refrigerant circulation line 100, the compressor 110 operates, and the high-temperature, high-pressure refrigerant is discharged from the compressor 110. Further, the refrigerant discharged from the compressor 110 is cooled while exchanging heat with the coolant in the condenser 120. Thereafter, the refrigerant cooled and condensed in the condenser 120 is divided in the refrigerant branch part 101. A part of the refrigerant passes through the refrigerant heat exchanger 180 and then be throttled and expanded while passing through the first expansion valve 130. Thereafter, the expanded refrigerant exchanges heat with the coolant in the secondary cooling line 250 while passing through the evaporator 140, and the coolant in the secondary cooling line 250 is cooled by the refrigerant.

Further, the refrigerant evaporated in the evaporator 140 passes through the refrigerant heat exchanger 180, exchanges heat with the refrigerant before the refrigerant is introduced into the first expansion valve 130, and then flows into the compressor 110 again via the accumulator 170.

In addition, the remaining part of refrigerant divided in the refrigerant branch part 101 is throttled and expanded while passing through the second expansion valve 150. Thereafter, the expanded refrigerant is evaporated by exchanging heat with the coolant while passing through the chiller 160, such that the coolant may be cooled. Further, the refrigerant evaporated in the chiller 160 flows into the compressor 110 again via the accumulator 170.

As described above, the refrigerant having passed through the evaporator 140 and the refrigerant having passed through the chiller 160 merge with each other in the accumulator 170 and flow into the compressor 110. The refrigerant circulates as the above-mentioned process is repeated.

The coolant in the coolant circulation line 200 is circulated by the operations of the second pump 232, the fourth pump 252, and the third pump 221. Further, the coolant may be heated while passing through the condenser 120, heated by the coolant heater 233, and heated by waste heat of the electrical component 253. The coolant may be cooled while passing through the chiller 160.

In this case, the second direction switching valve 231 and the first direction switching valve 212 may adjust the directions thereof so that the heating line 230 and the refrigerating line 210 are separated. More specifically, the coolant may flow as the upper side and the right side of the second direction switching valve 231 are connected to each other, and the coolant may flow as the lower side and the left side of the second direction switching valve 231 are connected to each other. Further, when left side and the lower side of the first direction switching valve 212 are connected to each other, the coolant may flow, and the right side of the first direction switching valve 212 may be disconnected. In addition, the upper side and the left side of the third direction switching valve 215 may be connected to each other, and the right side of the third direction switching valve 215 may be blocked.

Therefore, the coolant in the heating line 230 sequentially passes through the second pump 232, the coolant heater 233, the heater core 234, the second direction switching valve 231, and the condenser 120, flows into the second pump 232 again, and circulates. This cycle is repeated. In this case, the coolant passes through the heater core 234 while exchanging heat with the air blown by the air blower of the air conditioning device 190, such that the air is heat. The heated air is supplied to the vehicle interior and used to heat the vehicle interior.

Further, the coolant in the refrigerating line 210 separated from the heating line 230 flows from the fourth pump 252 sequentially to the second direction switching valve 231, the electrical component 253, the fourth direction switching valve 261, the third coolant joint 272, the chiller 160, the third direction switching valve 215, and the radiator 211. The coolant having passed through the radiator is divided in the third coolant joint 272. A part of the coolant flows into the fourth pump 252 via the first direction switching valve 212. The remaining part of the coolant flows along the fifth connection line 290, performs heat exchange in the evaporator 140, flows to the fifth coolant joint **290*b* again, merges with the coolant passing through the third direction switching valve 215, and then flows to the radiator 211**.

In this case, the upper side and the right side of the fourth direction switching valve 261 may be connected to each other so that the coolant flows to the chiller 160. The coolant flows to the chiller 160 via the third coolant joint 272.

Therefore, the electrical component 253 and the chiller 160 may be connected in series, and a coolant flow path capable of absorbing both outside air and waste heat may be formed. In this structure, since there is no branch part in the refrigerating line 210 circulating through the radiator 211, the electrical component 253, and the chiller 160, the coolant may flow at an almost constant flow rate, which may improve the heating performance.

In this case, the coolant may not flow to the battery 213 through the first direction switching valve 212 and the third direction switching valve 215.

Figure 6:
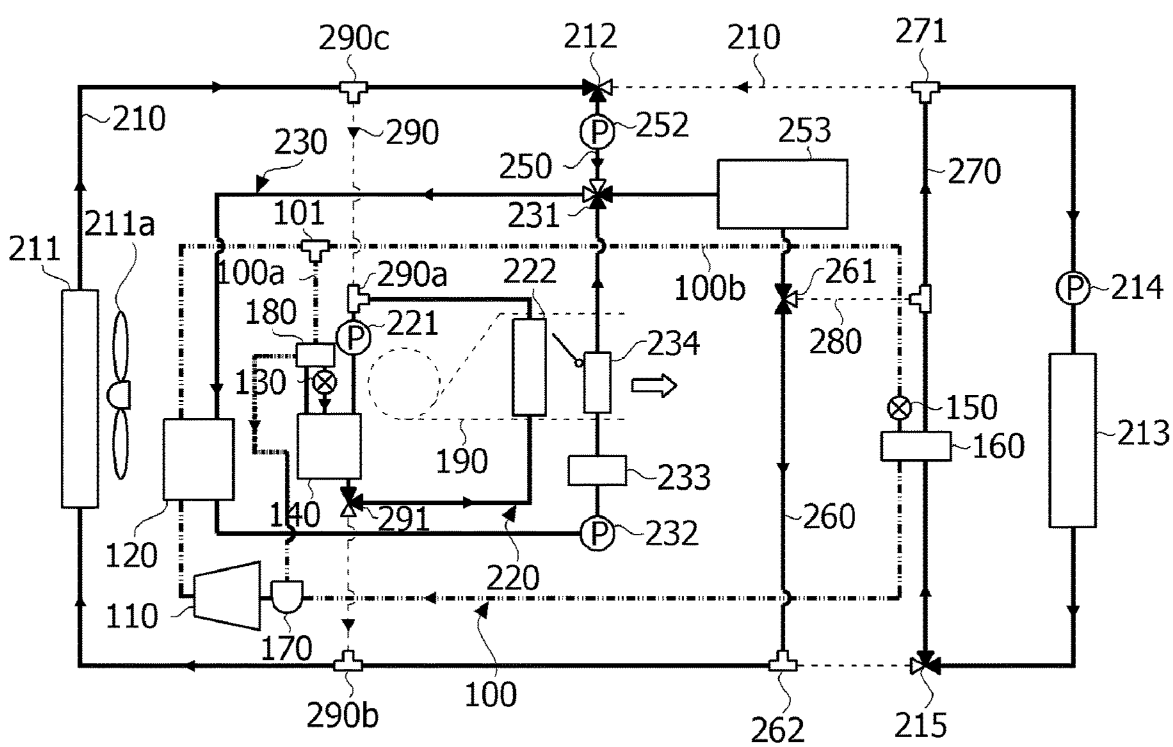
FIG. 6 is a view illustrating an operating state of the system in a cooling mode in FIG. 3.

FIG. 6 is a view illustrating an operating state of the system in a cooling mode in FIG. 3.

Referring to FIG. 6, in the refrigerant circulation line 100, the compressor 110 operates, and the high-temperature, high-pressure refrigerant is discharged from the compressor 110. Further, the refrigerant discharged from the compressor 110 is cooled while exchanging heat with the coolant in the condenser 120. Thereafter, the refrigerant cooled and condensed in the water-cooled condenser 120 is divided in the refrigerant branch part 101. A part of the refrigerant passes through the refrigerant heat exchanger 180 and then be throttled and expanded while passing through the first expansion valve 130. Thereafter, the expanded refrigerant exchanges heat with the coolant in the secondary cooling line 250 while passing through the evaporator 140, and the coolant in the secondary cooling line 250 is cooled by the refrigerant.

Further, the refrigerant evaporated in the evaporator 140 passes through the refrigerant heat exchanger 180, exchanges heat with the refrigerant before the refrigerant is introduced into the first expansion valve 130, and then flows into the compressor 110 again via the accumulator 170.

In addition, the remaining part of refrigerant divided in the refrigerant branch part 101 is throttled and expanded while passing through the second expansion valve. Thereafter, the expanded refrigerant is evaporated by exchanging heat with the coolant while passing through the chiller 160, such that the coolant may be cooled. Further, the refrigerant evaporated in the chiller 160 flows into the compressor 110 again via the accumulator 170.

As described above, the refrigerant having passed through the evaporator 140 and the refrigerant having passed through the chiller 160 merge with each other in the accumulator 170 and flow into the compressor 110. The refrigerant circulates as the above-mentioned process is repeated.

In addition, the coolant is circulated in the cooling line 220 by the operation of the third pump 221. Further, the coolant passes through the cabin cooler 222 while exchanging heat with the air blown by the air blower of the air conditioning device 190, such that the air is cooled. The cooled air is supplied to the vehicle interior and used to cool the vehicle interior. In this case, the upper side and the right side of the fifth direction switching valve 291 disposed in the fifth connection line 290 are connected to each other, and the lower side of the fifth direction switching valve 291 is closed, such that the cooling line 220 circulates in a closed loop structure.

Meanwhile, the coolant in the coolant circulation line 200 is circulated by the operations of the second pump 232, the fourth pump 252, and the first pump 214. Further, the battery 213, the electrical component 253, and the refrigerant passing through the condenser 120 may be cooled by the coolant. The heated coolant may be cooled while exchanging heat with the outside air by the operation of the cooling fan 211*a* of the radiator 211 for the electrical component.

In this case, the second direction switching valve 231 and the first direction switching valve 212 may adjust the directions thereof so that the heating line 230 and the refrigerating line 210 are connected. More specifically, the coolant may flow as the upper side and the left side of the second direction switching valve 231 are connected to each other, and the coolant may flow as the lower side and the right side of the second direction switching valve 231 are connected to each other. Further, when the left side and the lower side of the first direction switching valve 212 are connected to each other, the coolant may flow, and the right side of the first direction switching valve 212 may be disconnected. In addition, the upper side and the right side of the third direction switching valve 215 may be connected to each other, and the left side of the third direction switching valve 215 may be blocked.

Therefore, the coolant flows from the radiator 211 sequentially to the first direction switching valve 212, the fourth pump 252, the second direction switching valve 231, the condenser 120, the second pump 232, the coolant heater 233, the heater core 234, the second direction switching valve 231, the electrical component 253, and the second coolant joint 262, flows into the radiator 211 again, and circulates. This cycle is repeated.

In this case, the right line of the fourth direction switching valve 261 may be closed, thereby preventing the coolant from flowing to the fourth connection line 280.

The first direction switching valve 212 may prevent the coolant from flowing from the first direction switching valve 212 to the first coolant joint 271, and the third direction switching valve 215 may prevent the coolant from flowing from the third direction switching valve 215 to the second coolant joint 262.

In addition, the coolant may flow from the chiller 160 sequentially to the first coolant joint 271, the first pump 214, the battery 213, and the third direction switching valve 215, flows into the chiller 160 again, and circulates. This cycle is repeated. That is, the battery 213 and the chiller 160 may define a separate closed loop, in which the coolant circulates, in the refrigerating line 210 by the first direction switching valve 212 and the third direction switching valve 215, such that the battery 213 may be separately cooled.

FIGS. 7 to 13 illustrate a second embodiment of the present invention.

Figure 1:
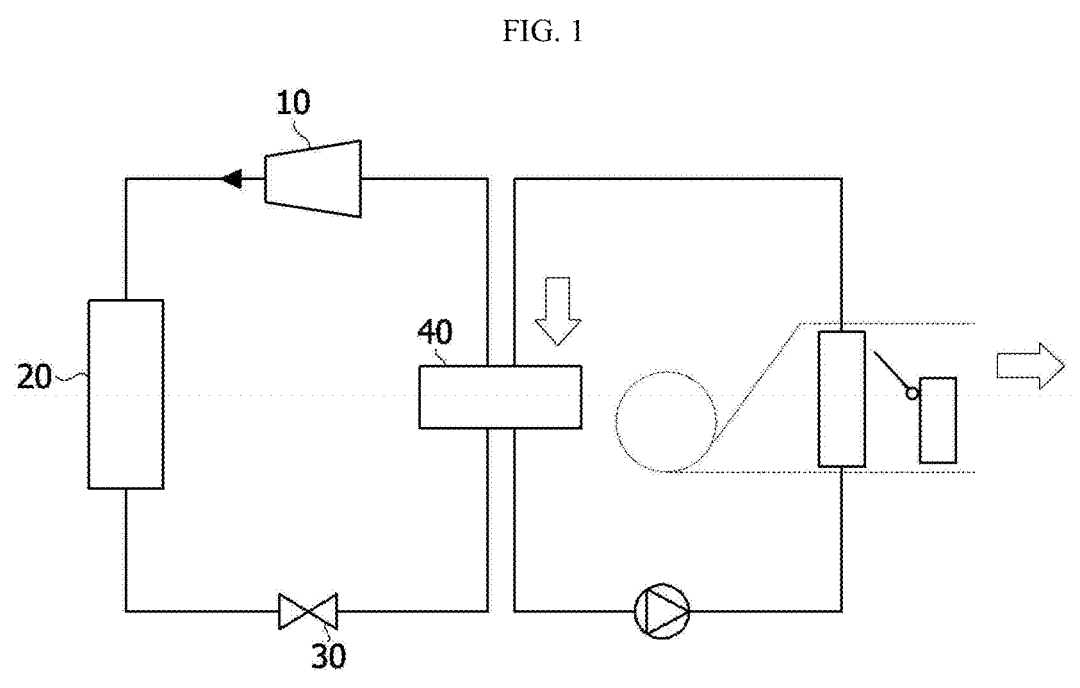
Figure 7:
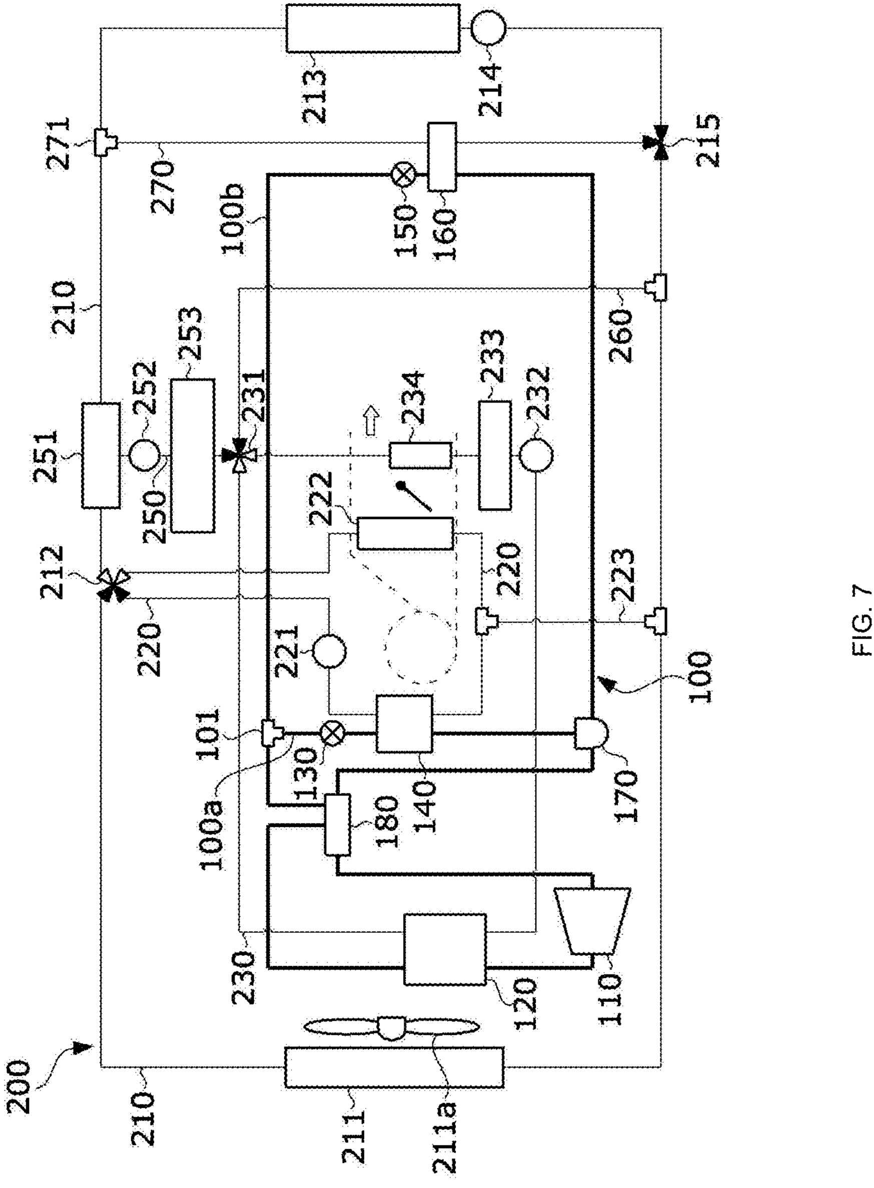
FIG. 7 is a structural view of a vehicle heat pump system according to a second embodiment of the present invention.
Figure 8:
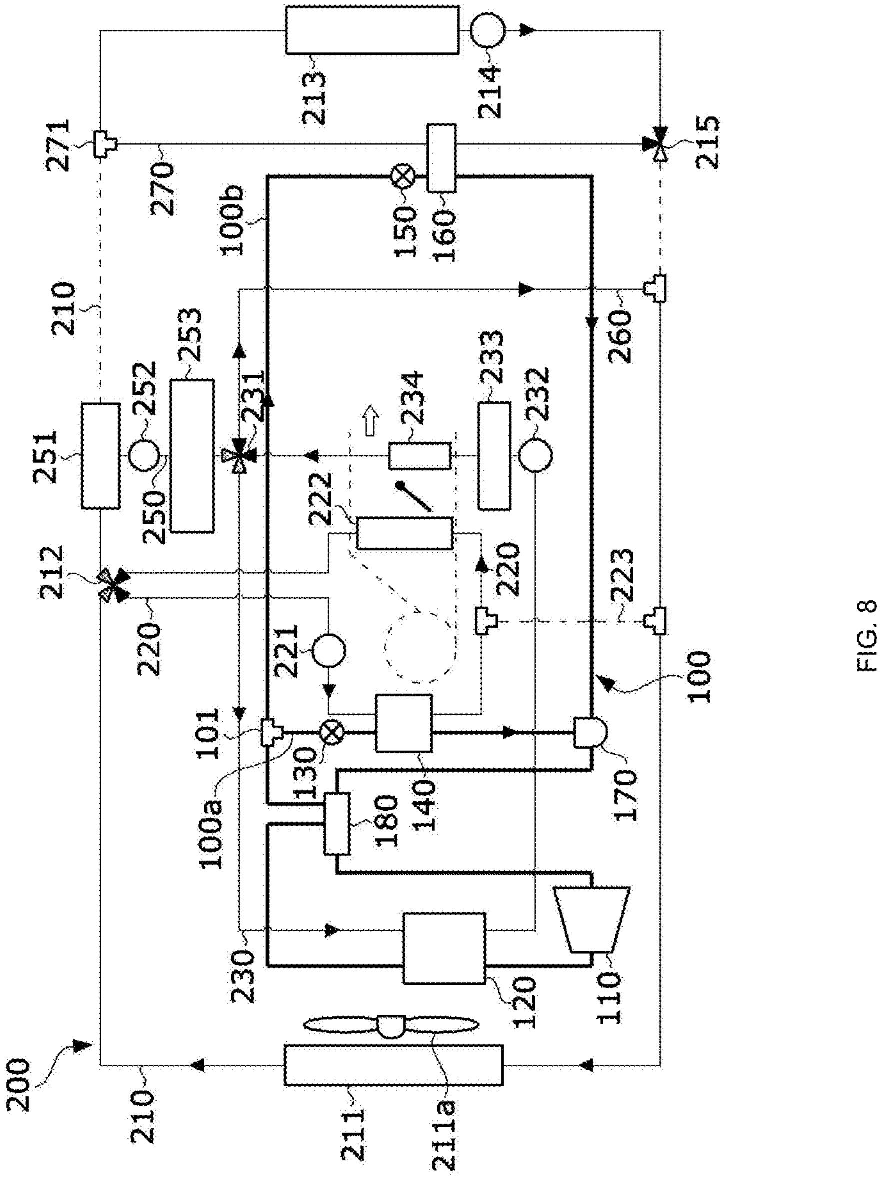
FIG. 8 is a view illustrating an operation in a first air conditioning mode in FIG. 7.
Figure 9:
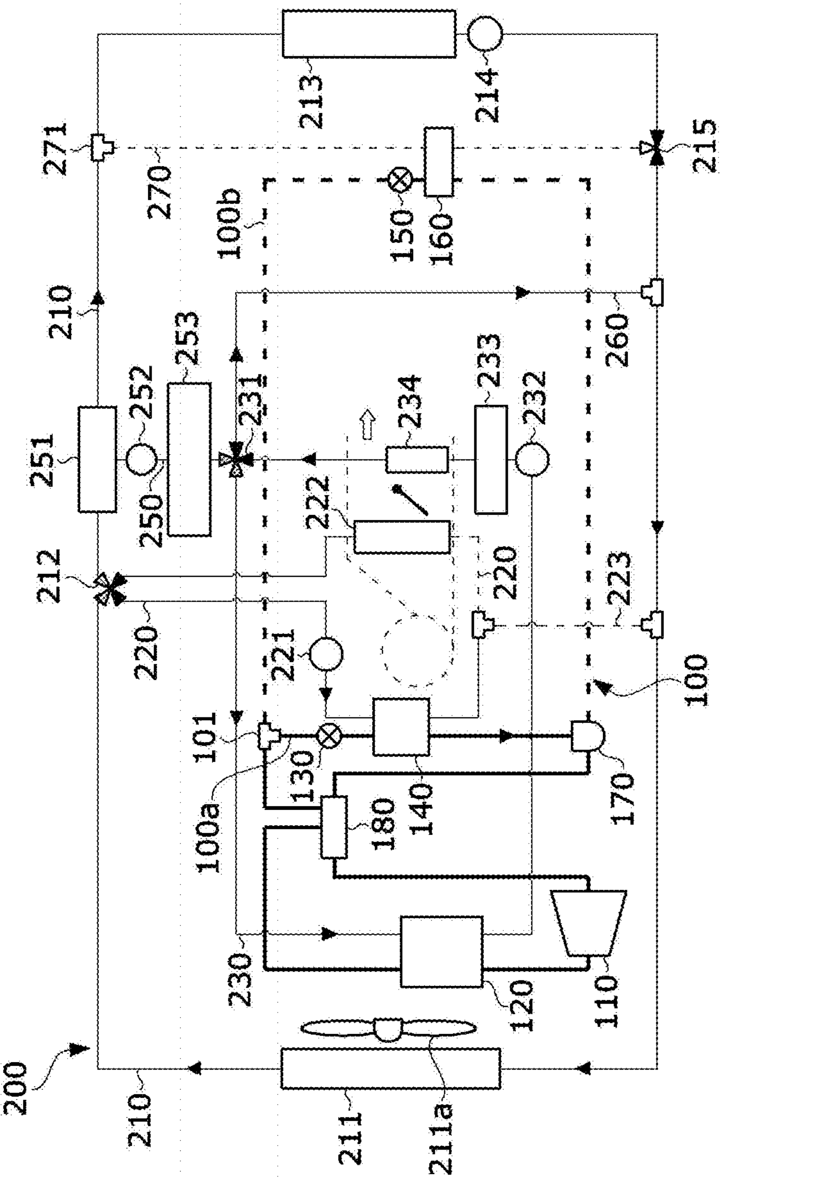
FIG. 9 is a view illustrating an operation in a second air conditioning mode in FIG. 7.
Figure 10:
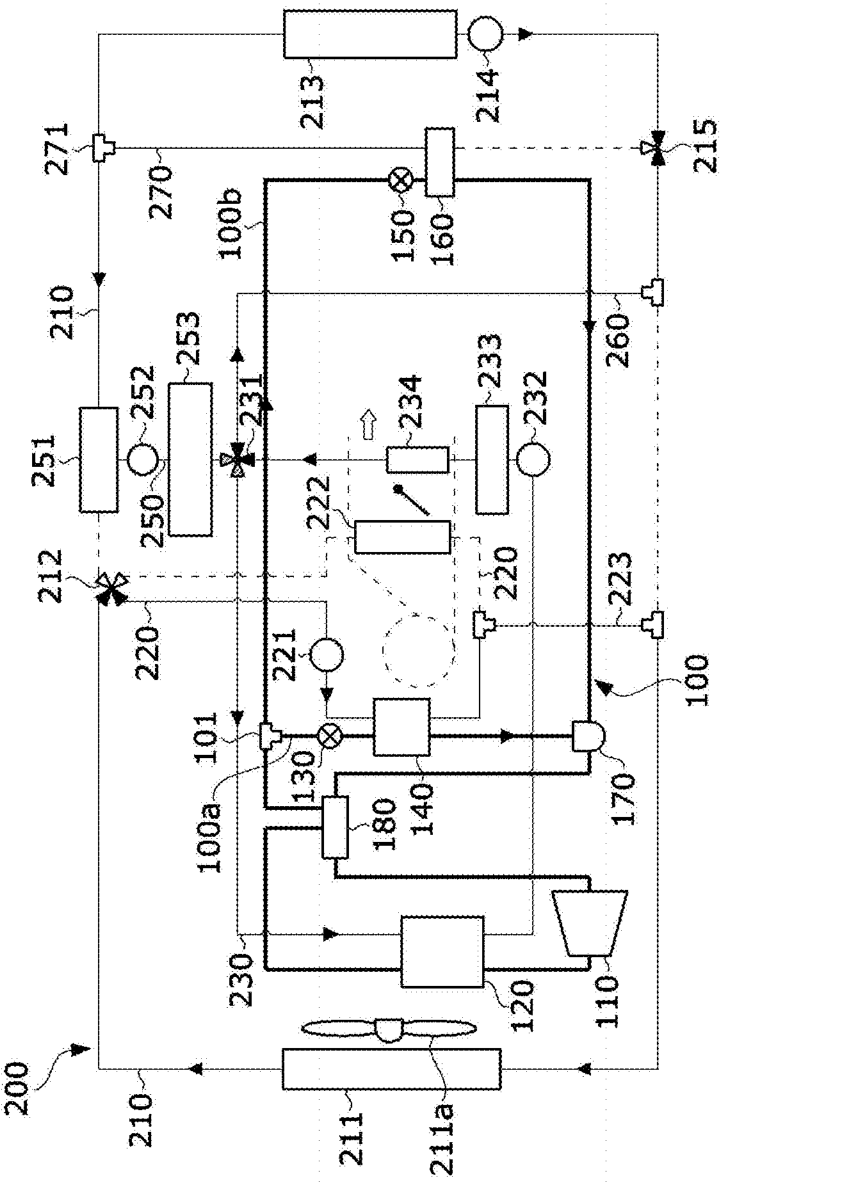
FIG. 10 is a view illustrating an operation in a third air conditioning mode in FIG. 7.
Figure 11:
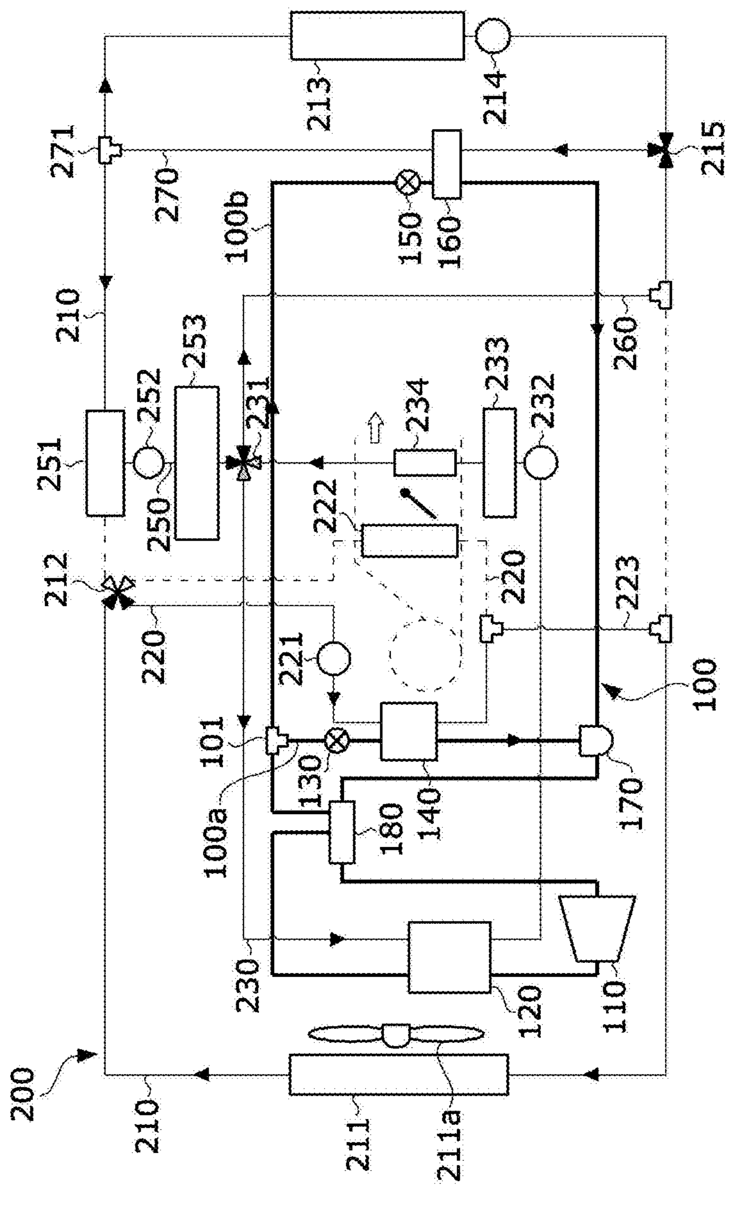
FIG. 11 is a view illustrating an operation in a fourth air conditioning mode in FIG. 7.
Figure 12:
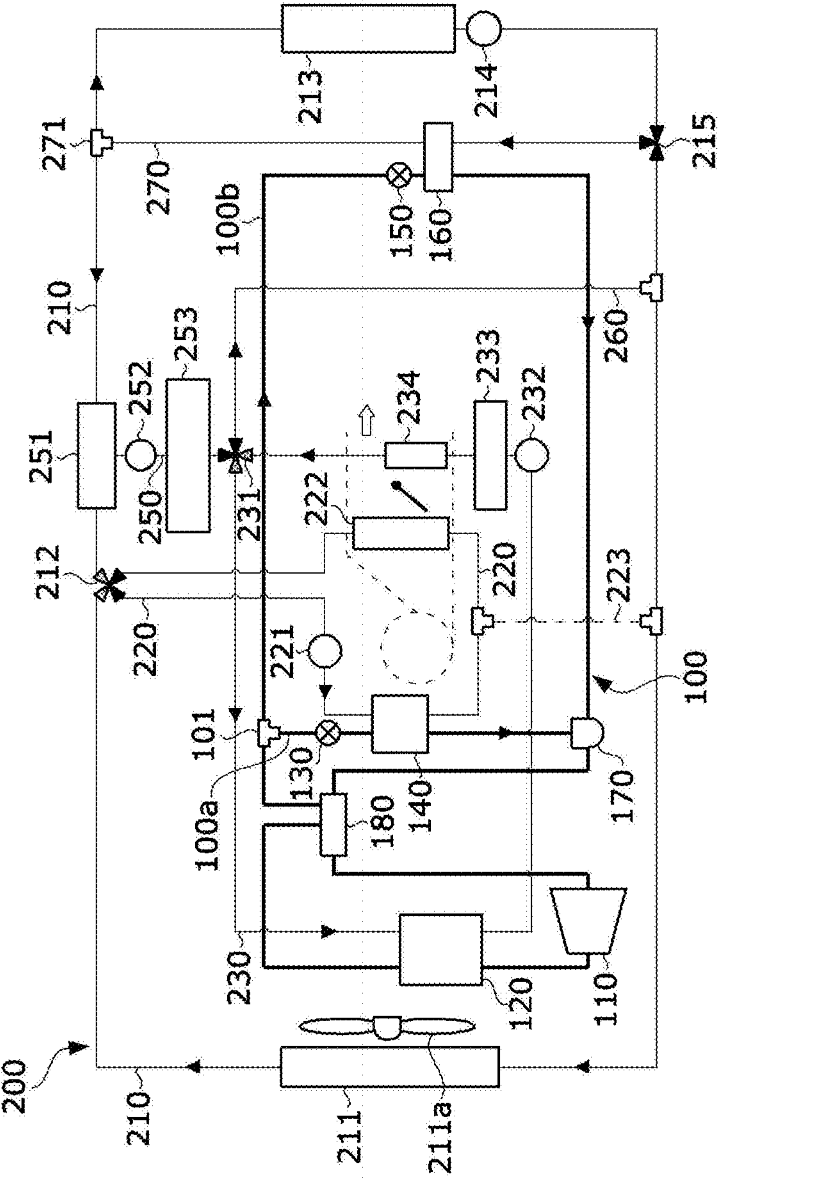
FIG. 12 is a view illustrating an operation in a fifth air conditioning mode in FIG. 7.
Figure 13:
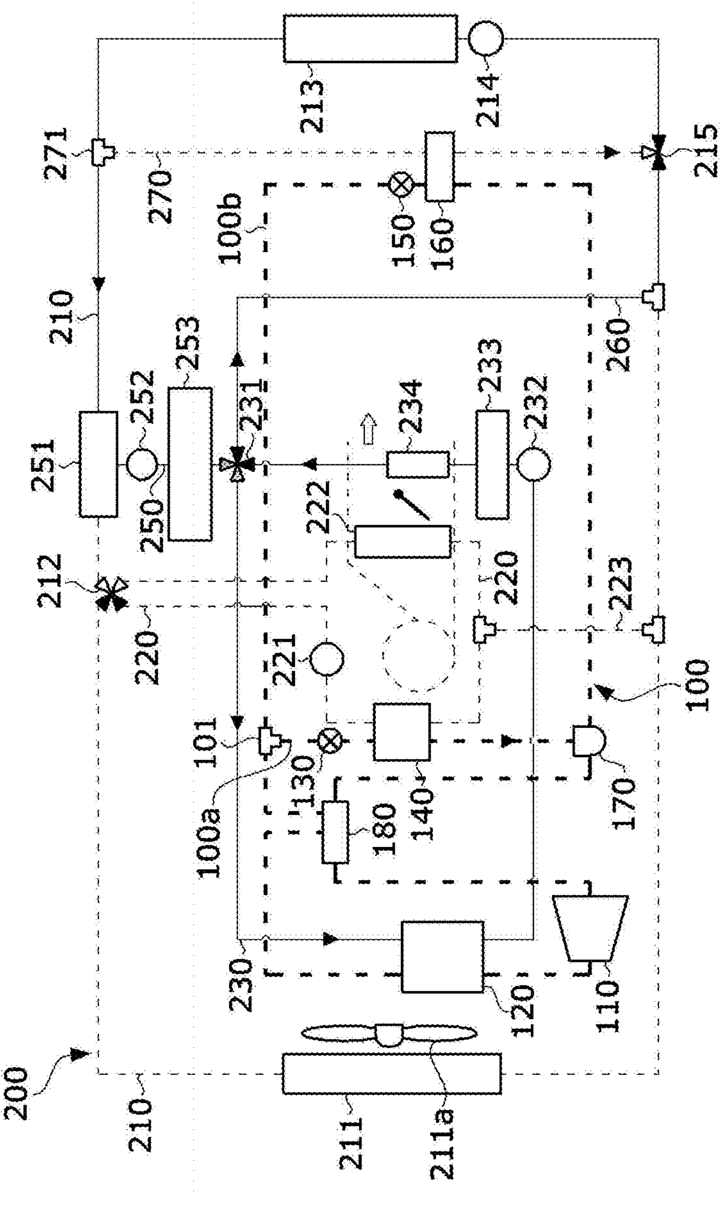
FIG. 13 is a view illustrating an operation in a sixth air conditioning mode in FIG. 1.

FIG. 7 is a structural view of a vehicle heat pump system according to a second embodiment of the present invention, FIG. 8 is a view illustrating an operation in a first air conditioning mode in FIG. 7, FIG. 9 is a view illustrating an operation in a second air conditioning mode in FIG. 7, FIG. 10 is a view illustrating an operation in a third air conditioning mode in FIG. 7, FIG. 11 is a view illustrating an operation in a fourth air conditioning mode in FIG. 7, FIG. 12 is a view illustrating an operation in a fifth air conditioning mode in FIG. 7, and FIG. 13 is a view illustrating an operation in a sixth air conditioning mode in FIG. 1.

Referring to FIG. 7, the vehicle heat pump system according to the embodiment of the present invention may include the refrigerant circulation line 100 configured to circulate the refrigerant and cool the vehicle interior; and the coolant line 200 configured to circulate the coolant, heat the vehicle interior, and cool components. Further, the coolant line 200 may include the refrigerating line 210 and the heating line 230.

The refrigerant circulation line 100 may include the compressor 110, the water-cooled condenser 120, the refrigerant branch part 101, the first refrigerant line branching off from the refrigerant branch part 101 and configured such that the first expansion valve 130 and the water-cooled evaporator 140 are disposed therein, and the second refrigerant line branching off from the refrigerant branch part 101 and configured such that the second expansion valve 150 and the chiller 160 are disposed therein.

The compressor 110 operates by receiving power from an engine (internal combustion engine) or a motor. The compressor 110 sucks the refrigerant, compresses the refrigerant into a high-temperature, high-pressure gaseous refrigerant, and then discharges the refrigerant to the water-cooled condenser 120.

The refrigerant flowing through the water-cooled condenser 120 exchanges heat with the coolant in the heating line 230 and then flows to the first expansion valve 130. As described above, the coolant heated by the refrigerant passing through the water-cooled condenser 120 may be supplied to the interior heat exchanger through the coolant circulation line.

The refrigerant branch part 101 may distribute the refrigerant flowing along the refrigerant circulation line 100 to the first refrigerant line and the second refrigerant line.

The first expansion valve 130 and the water-cooled evaporator 140 may be disposed in the first refrigerant line.

The first expansion valve 130 may throttle the refrigerant introduced from the first refrigerant line, perform a bypass operation on the refrigerant, or block a flow of the refrigerant. The first expansion valve 130 may be disposed at a side adjacent to the inlet of the water-cooled evaporator 140 based on the flow direction of the refrigerant.

The water-cooled evaporator 140 is disposed in the first refrigerant line. The refrigerant discharged from the first expansion valve 130 is supplied to the water-cooled evaporator 140 and passes through the water-cooled evaporator 140 while exchanging heat with the coolant passing through the cooling line 220.

The second expansion valve 150 may throttle the refrigerant introduced through the second refrigerant line, perform a bypass operation on the refrigerant, or block the flow of the refrigerant. The second expansion valve 150 may be disposed at a side adjacent to the inlet of the chiller 160 based on the flow direction of the refrigerant.

The low-temperature, low-pressure refrigerant discharged from the second expansion valve 150 is supplied to the chiller 160 and exchanges heat with the coolant flowing in the coolant line 200. The cold coolant made by heat exchange in the chiller 160 may flow along the coolant line 200 and exchange heat with the high-temperature battery 213. That is, the battery 213 exchanges heat with the coolant instead of exchanging heat with the refrigerant.

The accumulator 170 is installed at a side adjacent to the inlet of the compressor 110. The refrigerant having passed through the evaporator and/or the chiller 160 merges into the accumulator 170. The accumulator 170 may divide the refrigerant into a liquid refrigerant and a gaseous refrigerant and supply only the gaseous refrigerant to the compressor 110.

In addition, the refrigerant heat exchanger 180 may be disposed in the refrigerant circulation line 100.

The refrigerant heat exchanger 180 allows the refrigerant passing through the water-cooled condenser 120 and flowing to the refrigerant branch part 101 and the refrigerant discharged from the accumulator 170 to exchange heat with each other, thereby improving cooling performance. In this case, the inlet side refrigerant line configured to connect the water-cooled condenser 120 and the refrigerant branch part 101 passes through the refrigerant heat exchanger 180, and the outlet side refrigerant line passes through the accumulator 170 and the compressor 110, such that the refrigerant passing through the inlet side refrigerant line and the refrigerant passing through the outlet side refrigerant line may exchange heat with each other.

Therefore, the refrigerant may be further cooled by the refrigerant heat exchanger 180 before being divided by the refrigerant branch part, thereby improving cooling performance implemented by the evaporator and improving efficiency of the cooling system.

The refrigerating line 210 may include the radiator 211, the first direction switching valve 212, the battery 213, the first pump 214, and the third direction switching valve 215.

The radiator 211 cools the coolant having exchanged heat with the electrical component 253 and/or the battery 213. The radiator 211 may be cooled by the cooling fan 211*a* in an air-cooled manner.

The first direction switching valve 212 may connect the refrigerating line 210 and the cooling line 220 and control the flow of the coolant so that the refrigerating line 210 and the cooling line 220 are connected or disconnected according to the air conditioning mode.

A 4-way valve may be used as the first direction switching valve 212. The two branch points of the first direction switching valve 212 may be connected to the refrigerating line 210, and the remaining two branch points of the first direction switching valve 212 may be connected to the cooling line 220.

In one embodiment, a binary valve may be used as the first direction switching valve 212.

The first direction switching valve 212 may control the flow direction of the coolant on the basis of the air conditioning mode to be described below, thereby improving heating efficiency.

The battery 213 serves as a power source for the vehicle. The battery 213 may serve as a driving source for various types of electrical components 253 in the vehicle. In addition, the battery 213 may be connected to a fuel cell and serve to store electricity. Alternatively, the battery 213 may serve to store electricity supplied from the outside. The battery 213 may be cooled or heated by exchanging heat with the flowing coolant.

The first pump 214 is disposed in the refrigerating line 210 and serves to pump the coolant.

The third direction switching valve 215 may be disposed in the refrigerating line 210, and the third connection line 270 passing through the chiller 160 may be connected to one side of the third direction switching valve 215. The third direction switching valve 215 may control the flow of the coolant on the basis of the air conditioning mode.

The second direction switching valve 231, the water-cooled condenser 120, the second pump 232, the coolant heater 233, and the heater core 234 may be disposed in the heating line 230.

The second direction switching valve 231 may be connected to the first connection line 250, the second connection line 260, and the heating line 230, and the refrigerating line 210 and the heating line 230 may be connected or disconnected by the second direction switching valve 231.

More specifically, the second direction switching valve 231 may be installed in the heating line 230. Two coolant line pipes may be connected to the second direction switching valve 231. A single first connection line 250 branching off from one side of the refrigerating line 210 may be connected to the second direction switching valve 231. A single second connection line branching off from the other side of the refrigerating line 210 may be connected to the second direction switching valve 231. That is, four coolant lines 200 may be connected to the second direction switching valve 231 so as to meet together. The first direction switching valve 212 may be a 4-way direction switching valve capable of adjusting states in which the four coolant lines 200 are connected to or disconnected from one another.

The coolant passing through the water-cooled condenser 120 may exchange heat with the refrigerant passing through the water-cooled condenser 120.

The second pump 232 is a mean disposed in the heating line 230 and configured to pump the coolant so that the coolant flows along the heating line 230.

The coolant heater 233 refers to a device for heating the coolant. The coolant heater 233 is connected and disposed rearward of the second pump 232 and forward of the heater core 234 based on the flow direction of the coolant. Further, the coolant heater 233 may operate when a temperature of the coolant is equal to or lower than a particular temperature. Various components such as an induction heater, a sheath heater, a PTC heater, or a film heater capable of generating heat using electric power may be used as the coolant heater 233.

The heater core 234 may be disposed in the air conditioning device of the vehicle. The air flowing by the air blower may be heated while passing through the heater core 234, supplied to the vehicle interior, and used to heat the vehicle interior. Further, the heater core 234 may be connected and disposed rearward of the coolant heater 233 based on the flow direction of the coolant.

A cabin cooler 222 is disposed in the cooling line 220, and the vehicle interior may be cooled by using the coolant passing through the water-cooled evaporator 140. The third pump 221 and the cabin cooler 222 may be disposed in the cooling line 220, and the cooling line 220 may be connected to the refrigerating line 210 through the cooling connection line 223.

The third pump 221 is a means disposed in the cooling line 220 and configured to pump the coolant so that the coolant flows along the cooling line 220.

The cabin cooler 222 serves as an air-cooled evaporator. The coolant cooled by exchanging heat with the refrigerant passing through the water-cooled evaporator 140 passes through the cabin cooler 222. Further, the cabin cooler 222 is disposed in the air conditioning device. The air flowing by the air blower of the air conditioning device is cooled while passing through the cabin cooler 222, supplied to the vehicle interior, and used to cool the vehicle interior.

The cooling connection line 223 may connect the cooling line 220 and the refrigerating line 210. The cooling connection line 223 may allow the coolant to flow according to the air conditioning mode. The cooling connection line 223 may allow the coolant introduced through the refrigerating line 210 to flow into the refrigerating line 210 again via the water-cooled evaporator 140 disposed in the cooling line 220.

In one embodiment, one side of the cooling connection line 223 may be disposed between the water-cooled evaporator 140 and the cabin cooler 222. This is to prevent the coolant flowing along the cooling line 220 from being introduced into the cabin cooler 222 when the refrigerating line 210 and the cooling line 220 are connected by the first direction switching valve 212.

The first connection line 250 may branch off from one side of the refrigerating line 210 and be connected to one region of the heating line 230.

A reservoir tank 251, the third pump 221, and the electrical component 253 may be disposed in the first connection line 250.

The reservoir tank 251 may serve to store the coolant and supplement the coolant in the coolant line.

In one embodiment, the reservoir tank 251 may be disposed at a connection portion between the first connection line 250 and the refrigerating line 210. Since the reservoir tank 251 is disposed at the connection portion between the first connection line 250 and the refrigerating line 210 as described above, it is possible to improve efficiency in supplementing or storing the coolant regardless of the flow direction of the coolant according to the air conditioning mode.

The fourth pump 252 may be disposed in the first connection line 250 and pump the coolant.

The electrical component 253 may be disposed in the first connection line 250. The electrical component 253 may be cooled by the coolant. Further, the electrical component 253 may be a drive motor, an inverter, a charger (onboard charger (OBC)), or the like.

The second connection line 260 may branch off from the other side of the refrigerating line 210 and be connected to one region of the heating line 230. One side of the second connection line 260 is connected to the second direction switching valve 231 disposed in the heating line 230, and the other side of the second connection line 260 may be connected to one region of the refrigerating line 210.

The third connection line 270 may branch off from the first coolant joint 271 disposed in the refrigerating line 210. One side of the third connection line 270 may be connected to the refrigerating line 210, and the other side of the third connection line 270 may be connected to the third direction switching valve 215. The coolant flowing through the third connection line 270 may pass through the chiller 160.

In this case, the chiller 160 is as described above with reference to the refrigerant circulation line 100.

The third direction switching valve 215 may be disposed in the refrigerating line 210, and two coolant pipes are connected to the third direction switching valve 215. The third direction switching valve 215 may be a 3-way direction switching valve to which the other side of the third connection line 270 is connected.

In one embodiment, the third connection line 270 may be connected in parallel with the refrigerating line 210 in which the battery 213 is disposed.

FIG. 8 is a view illustrating an operation in a first air conditioning mode in FIG. 7.

Referring to FIG. 8, the first air conditioning mode is a mode in which the vehicle interior is cooled and the battery 213 is cooled by the chiller 160.

In the first air conditioning mode, the compressor 110 operates in the refrigerant circulation line 100, and the high-temperature, high-pressure refrigerant is discharged from the compressor 110. Further, the refrigerant discharged from the compressor 110 is cooled while exchanging heat with the coolant in the water-cooled condenser 120. The refrigerant having passed through the water-cooled condenser 120 passes through the refrigerant heat exchanger 180 while exchanging heat with the refrigerant passing through the accumulator 170.

Thereafter, the refrigerant having passed through the refrigerant heat exchanger 180 is divided in the refrigerant branch part 101. A part of the refrigerant is throttled and expanded while passing through the first expansion valve 130 disposed in the first refrigerant line. Thereafter, the expanded refrigerant exchanges heat with the coolant in the secondary cooling line 220 while passing through the water-cooled evaporator 140, and the coolant in the secondary cooling line 220 is cooled by the refrigerant.

Further, the refrigerant evaporated in the water-cooled evaporator 140 is divided into a gaseous refrigerant and a liquid refrigerant while passing through the accumulator 170, passes through the refrigerant heat exchanger 180, and then flows into the compressor 110 again.

In addition, the remaining part of refrigerant divided in the refrigerant branch part 101 is throttled and expanded while passing through the second expansion valve 150 disposed in the second refrigerant line. Thereafter, the expanded refrigerant is evaporated by exchanging heat with the coolant while passing through the chiller 160, such that the coolant may be cooled. Further, the refrigerant evaporated in the chiller 160 is divided into a gaseous refrigerant while passing through the accumulator 170 and then flows into the compressor 110 again via the refrigerant heat exchanger 180.

As described above, the refrigerant having passed through the water-cooled evaporator 140 and the refrigerant having passed through the chiller 160 merge with each other in the accumulator 170 and flow into the compressor 110. The refrigerant circulates as the above-mentioned process is repeated.

Meanwhile, the coolant in the coolant line 200 is circulated by the operations of the first to fourth pumps 214, 232, 221, and 252.

In this case, the first direction switching valve 212 may operate so that the refrigerating line 210 and the cooling line 220 are separated. The third direction switching valve 215 blocks the coolant line connected to the radiator 211, so that the coolant passing through the battery 213 and the chiller 160 defines the closed loop.

The coolant pumped by the fourth pump 252 disposed in the first connection line 250 passes through the electrical component 253, and the coolant having passed through the electrical component 253 may pass through the second direction switching valve 231.

In this case, the second direction switching valve 231 connects the first connection line 250 to one region of the heating line 230, such that a temperature of the coolant having passed through the electrical component 253 is increased as the coolant passes through the water-cooled condenser 120. The coolant with the increased temperature is pumped by the second pump 232 and flows into the second direction switching valve 231 via the coolant heater 233 and the heater core 234.

The coolant introduced into the second direction switching valve 231 after passing through the water-cooled condenser 120 flows along the second connection line 260. The coolant may be cooled by the cooling fan **211*a* while passing through the radiator 211 and then introduced into the first direction switching valve 212 again. The coolant having passed through the first direction switching valve 212 may flow into the reservoir tank 251 and then circulate through the fourth pump 252**.

The refrigerating line 210 and the cooling line 220 are separated by the first direction switching valve 212.

The coolant in the cooling line 220 circulates through the third pump 221. The coolant having performed the heat exchange while passing through the water-cooled evaporator 140 passes through the cabin cooler. The coolant passing through the cabin cooler 222 exchanges heat with the air blown by the air blower of the air conditioning device 190, such that the air is cooled. The cooled air is supplied to the vehicle interior and used to cool the vehicle interior.

In addition, the third direction switching valve 215 may operate so that the third connection line 270 is connected to one region of the refrigerating line 210. Therefore, the third direction switching valve 215 may prevent the coolant from flowing from the reservoir tank 251 to the first coolant joint 271.

The coolant flows from the chiller 160 and circulates sequentially through the first pump 214, the third direction switching valve 215, the first coolant joint 271, and the battery 213. This cycle is repeated. That is, the battery 213 and the chiller 160 defines a separate closed loop, in which the coolant circulates, by the third direction switching valve 215, such that the battery 213 may be separately cooled by the chiller 160.

FIG. 9 is a view illustrating an operation in a second air conditioning mode in FIG. 7.

Referring to FIG. 9, the second air conditioning mode is a mode in which the vehicle interior is cooled and the battery 213 is cooled by using the radiator 211.

In the second air conditioning mode, the compressor 110 operates in the refrigerant circulation line 100, and the high-temperature, high-pressure refrigerant is discharged from the compressor 110. Further, the refrigerant discharged from the compressor 110 is cooled while exchanging heat with the coolant in the water-cooled condenser 120. The refrigerant having passed through the water-cooled condenser 120 passes through the refrigerant heat exchanger 180 while exchanging heat with the refrigerant passing through the accumulator 170.

Thereafter, the refrigerant having passed through the refrigerant heat exchanger 180 is divided in the refrigerant branch part 101. A part of the refrigerant is throttled and expanded while passing through the first expansion valve 130. Thereafter, the expanded refrigerant exchanges heat with the coolant in the secondary cooling line 220 while passing through the water-cooled evaporator 140, and the coolant in the secondary cooling line 220 is cooled by the refrigerant.

Further, the refrigerant evaporated in the water-cooled evaporator 140 is divided into a gaseous refrigerant and a liquid refrigerant while passing through the accumulator 170, passes through the refrigerant heat exchanger 180, flows into the compressor 110 again, and then circulates.

In this case, in the second air conditioning mode, the chiller 160 is not used, and the second expansion valve 150 is closed, such that the refrigerant does not flow.

Meanwhile, the coolant in the coolant line 200 is circulated by the operations of the first to fourth pumps 214, 232, 221, and 252.

In this case, the first direction switching valve 212 may operate so that the refrigerating line 210 and the cooling line 220 are separated. The third direction switching valve 215 may close the third connection line 270 so that the coolant passing through the battery 213 flows into the radiator 211.

The coolant pumped by the fourth pump 252 disposed in the first connection line 250 passes through the electrical component 253, and the coolant having passed through the electrical component 253 may pass through the second direction switching valve 231.

In this case, the second direction switching valve 231 connects the first connection line 250 to one region of the heating line 230, such that a temperature of the coolant having passed through the electrical component 253 is increased as the coolant passes through the water-cooled condenser 120. The coolant with the increased temperature is pumped by the second pump 232 and flows into the second direction switching valve 231 via the coolant heater 233 and the heater core 234.

The coolant introduced into the second direction switching valve 231 after passing through the water-cooled condenser 120 flows along the second connection line 260. The coolant may be cooled by the cooling fan **211*a* while passing through the radiator 211 and then introduced into the first direction switching valve 212 again. The coolant having passed through the first direction switching valve 212 may flow into the reservoir tank 251 and then circulate through the fourth pump 252**.

The coolant divided in the reservoir tank 251 flows along the refrigerating line 210, flows to the battery 213 via the first coolant joint 271, and flows to the third direction switching valve 215 via the second pump 232. In this case, the third direction switching valve 215 blocks the flow of the coolant to the third connection line 270, such that the coolant flows into the radiator 211 and then circulates.

Therefore, the battery 213 may be cooled by the coolant circulating through the radiator 211.

The refrigerating line 210 and the cooling line 220 are separated by the first direction switching valve 212.

The coolant in the cooling line 220 circulates through the third pump 221. The coolant having performed the heat exchange while passing through the water-cooled evaporator 140 passes through the cabin cooler. The coolant passing through the cabin cooler 222 exchanges heat with the air blown by the air blower of the air conditioning device 190, such that the air is cooled. The cooled air is supplied to the vehicle interior and used to cool the vehicle interior.

FIG. 10 is a view illustrating an operation in a third air conditioning mode in FIG. 7.

Referring to FIG. 10, the third air conditioning mode is a mode in which the vehicle interior is heat, heat of the outside air is absorbed, and a temperature of the battery 213 is increased.

Because the operation of the refrigerant circulation line 100 in the third air conditioning mode is identical to the operation in the first air conditioning mode, a description thereof will be omitted.

One region of the refrigerating line 210 of the coolant line and one region of the cooling line 220 may be connected by the first direction switching valve 212.

The first direction switching valve 212 may connect the refrigerating line 210 adjacent to the radiator 211 and the cooling line 220 adjacent to the water-cooled evaporator 140 and operate to block the flow of the coolant between the refrigerating line 210 adjacent to the reservoir and the cooling line 220 adjacent to the cabin cooler 222.

The coolant having passed through the radiator 211 flows to the cooling line 220 through the first direction switching valve 212. The coolant having passed through the evaporator flows along the cooling connection line 223, flows into the radiator 211, and circulates. The circulation of the coolant may absorb heat from the outside air by means of the water-cooled evaporator 140. In this case, the first direction switching valve 212 may block the flow of the coolant flowing from the cooling line 220 to the cabin cooler 222.

The coolant circulating through the fourth pump 252 flows into the second direction switching valve 231 via the electrical component 253. In this case, the second direction switching valve 231 connects the first connection line 250 to one region of the heating line 230, such that a temperature of the coolant having passed through the electrical component 253 is increased as the coolant passes through the water-cooled condenser 120. The coolant with the increased temperature is pumped by the second pump 232 and flows into the second direction switching valve 231 via the coolant heater 233 and the heater core 234.

The coolant introduced into the second direction switching valve 231 after passing through the water-cooled condenser 120 flows along the second connection line 260 and flows to the battery 213. In this case, the third direction switching valve 215 may block the flow of the coolant to the third connection line 270.

The coolant having the temperature increased in the water-cooled condenser 120 may increase a temperature of the battery 213 while flowing along the refrigerating line 210, flow into the reservoir tank 251, and then circulate through the refrigerating line 210 and the heating line 230 through the fourth pump 252.

FIG. 11 is a view illustrating an operation in a fourth air conditioning mode in FIG. 7.

Referring to FIG. 11, the fourth air conditioning mode is a mode in which the vehicle interior is heat, heat of the outside air is absorbed, and heat generated by the electrical component 253 and the battery 213 is absorbed.

Because the operation of the refrigerant circulation line 100 in the fourth air conditioning mode is identical to the operation in the first air conditioning mode, a description thereof will be omitted.

One region of the refrigerating line 210 of the coolant line and one region of the cooling line 220 may be connected by the first direction switching valve 212.

The first direction switching valve 212 may connect the refrigerating line 210 adjacent to the radiator 211 and the cooling line 220 adjacent to the water-cooled evaporator 140 and operate to block the flow of the coolant between the refrigerating line 210 adjacent to the reservoir and the cooling line 220 adjacent to the cabin cooler 222.

The coolant having passed through the radiator 211 flows to the cooling line 220 through the first direction switching valve 212. The coolant having passed through the evaporator flows along the cooling connection line 223, flows into the radiator 211, and circulates. The circulation of the coolant may absorb heat from the outside air by means of the water-cooled evaporator 140. In this case, the first direction switching valve 212 may block the flow of the coolant flowing from the cooling line 220 to the cabin cooler 222.

The coolant circulating through the fourth pump 252 flows into the second direction switching valve 231 via the electrical component 253. In this case, the second direction switching valve 231 may control the flow of the coolant so that the heating line 230 independently circulates.

The coolant having passed through the electrical component 253 flows to the battery 213 along the second connection line 260. In this case, the third direction switching valve 215 may open the third connection line 270 so that the coolant may flow to the chiller 160.

The coolant flowing along the third connection line 270 may be cooled by heat exchange in the chiller 160, divided in the first coolant joint 271, and then moved.

The coolant circulating toward the reservoir tank 251 may absorb heat of the electrical component 253, and the coolant circulating toward the battery 213 may absorb heat of the battery 213.

The coolant in the heating line 230 absorbs heat from the water-cooled condenser 120. The coolant passing through the water-cooled condenser may heat the vehicle interior while defining a closed loop that circulates through the second direction switching valve 231 while passing through the second pump 232, the coolant heater 233, and the heater core 234.

FIG. 12 is a view illustrating an operation in a fifth air conditioning mode in FIG. 7.

Referring to FIG. 12, the fifth air conditioning mode is a mode in which the vehicle interior is heated and dehumidified, and heat is absorbed from the outside air, the electrical component 253, and the battery.

Because the operation of the refrigerant circulation line 100 in the fifth air conditioning mode is identical to the operation in the first air conditioning mode, a description thereof will be omitted.

Meanwhile, the coolant in the coolant line 200 is circulated by the operations of the first to fourth pumps 214, 232, 221, and 252.

The first direction switching valve 212 may operate so that the refrigerating line 210 and the cooling line 220 are separated.

The coolant pumped by the fourth pump 252 disposed in the first connection line 250 passes through the electrical component 253, and the coolant having passed through the electrical component 253 may pass through the second direction switching valve 231.

The coolant circulating through the fourth pump 252 flows into the second direction switching valve 231 via the electrical component 253. In this case, the second direction switching valve 231 may control the flow of the coolant so that the heating line 230 independently circulates.

The coolant having passed through the electrical component 253 flows along the second connection line 260 and flows by being divided in the region in which the second connection line 260 meets the refrigerating line 210.

The coolant flowing from the second connection line 260 toward the battery 213 flows into the third direction switching valve 215. The third direction switching valve 215 may open the third connection line 270 so that the coolant may flow to the chiller 160.

The coolant flowing along the third connection line 270 may be cooled by heat exchange in the chiller 160, divided in the first coolant joint 271, and then moved.

The coolant, which is divided in the first coolant joint 271 and circulates toward the reservoir tank 251, may absorb heat of the electrical component 253 while circulating through the first pump 214.

In addition, the coolant, which is divided in the first coolant joint 271 and circulates toward the battery 213, may absorb heat of the battery 213 and then flow to the third direction switching valve 215.

The coolant, which is divided in the second connection line 260 and circulates toward the radiator 211, is cooled by the cooling fan 211*a* while passing through the radiator 211, passes through the first direction switching valve 212, and then flows into the reservoir tank 251.

The coolant in the cooling line 220 circulates through the third pump 221, and the coolant passes through the cabin cooler. The coolant passing through the cabin cooler 222 exchanges heat with the air blown by the air blower of the air conditioning device, and moisture in the air is removed as the coolant and the air exchange heat with each other.

Meanwhile, the coolant in the heating line 230 absorbs heat from the water-cooled condenser 120. The coolant passing through the water-cooled condenser 120 may heat the vehicle interior while defining a closed loop that circulates through the second direction switching valve 231 while passing through the second pump 232, the coolant heater 233, and the heater core 234.

FIG. 13 is a view illustrating an operation in a sixth air conditioning mode in FIG. 7.

Referring to FIG. 13, the sixth air conditioning mode is a mode in which the vehicle interior is heated by using waste heat.

In the sixth air conditioning mode, the operation of the refrigerant circulation line 100 is stopped.

One region of the refrigerating line 210 of the coolant line 200 and one region of the cooling line 220 may be connected by the first direction switching valve 212. The first direction switching valve 212 may connect the refrigerating line 210 adjacent to the radiator 211 and the cooling line 220 adjacent to the water-cooled evaporator 140 and operate to block the flow of the coolant between the refrigerating line 210 adjacent to the reservoir and the cooling line 220 adjacent to the cabin cooler 222. However, since the third pump 221 does not operate, the operation of the coolant line 200 connected through the first direction switching valve 212 may be stopped.

The coolant circulating through the fourth pump 252 flows into the second direction switching valve 231 via the electrical component 253. In this case, the second direction switching valve 231 connects the first connection line 250 and one region of the heating line 230 so that the coolant having passed through the electrical component 253 passes through the water-cooled condenser 120.

However, since the refrigerant circulation line 100 does not operate, the coolant passes through the water-cooled condenser 120, and the coolant is pumped by the second pump 232 and flows into the second direction switching valve 231 via the coolant heater 233 and the heater core 234.

The coolant introduced into the second direction switching valve 231 after passing through the water-cooled condenser 120 flows along the second connection line 260 and flows to the battery 213. In this case, the third direction switching valve 215 may block the flow of the coolant to the third connection line 270.

The coolant having passed through the third direction switching valve 215 flows along the refrigerating line 210, and absorbs heat of the battery 213. The coolant may flow into the reservoir tank 251 and then circulate through the refrigerating line 210 and the heating line 230 through the fourth pump 252.

In this case, since the refrigerant circulation line 100 is stopped, the coolant heats the vehicle interior by using waste heat of the electrical component 253 and the battery 213.

FIGS. 14 to 20 relates to a vehicle heat pump system according to a third embodiment of the present invention.

Figure 14:
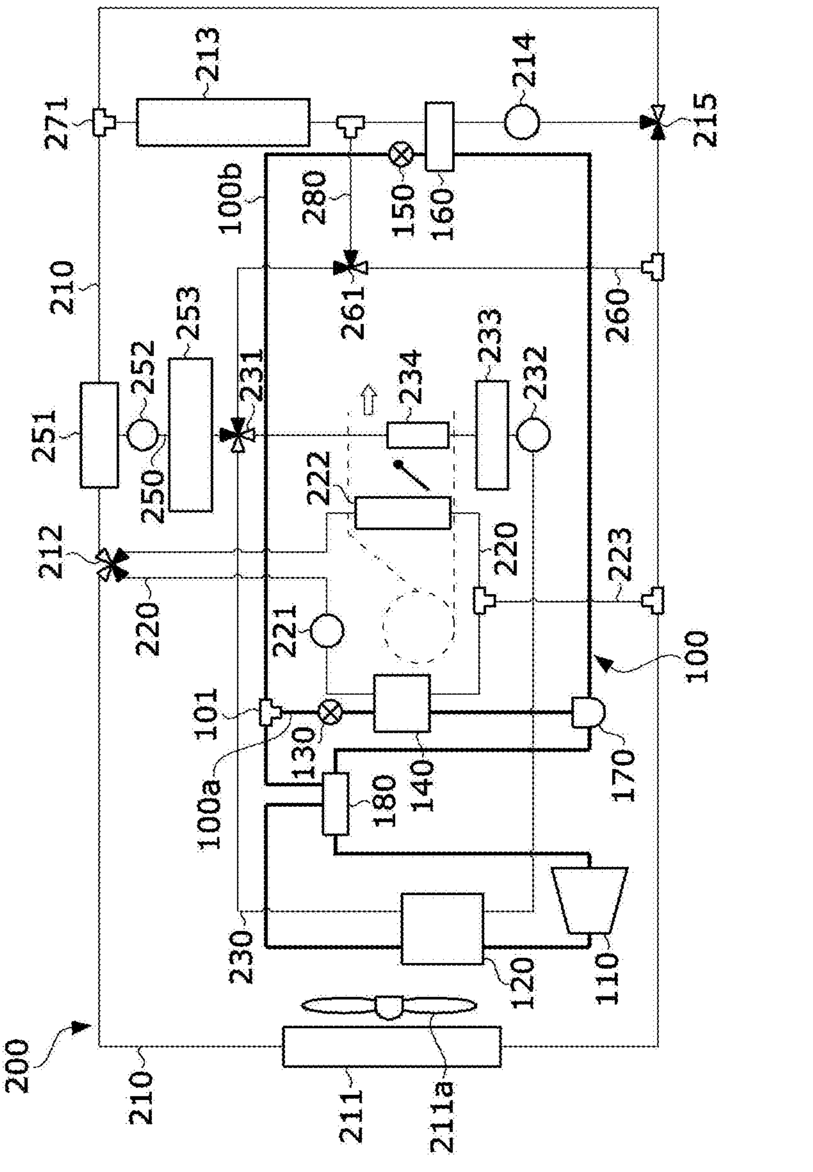
FIG. 14 is a structural view of a vehicle heat pump system according to a third embodiment of the present invention.

FIG. 14 is a structural view of a vehicle heat pump system according to a third embodiment of the present invention. Referring to FIG. 14, the vehicle heat pump system according to the present invention differs from the vehicle heat pump systems according to the above-mentioned embodiments in terms of arrangement structures of the battery 213 and the pump.

Because the refrigerant circulation line 100 of the vehicle heat pump system according to yet another embodiment of the present invention is identical in structure to the above-mentioned refrigerant circulation line 100, a description thereof will be omitted.

Because the coolant line is also identical in structure to the above-mentioned coolant line, only the difference will be described.

The fourth pump 252 disposed in the first connection line 250 may be eliminated according to the operation of the system.

The battery 213 and the first pump 214, which are disposed in the refrigerating line 210 in the above-mentioned embodiment, may be disposed in the third connection line 270.

The battery 213, the chiller 160, and the first pump 214 may be disposed in the third connection line 270, and the fourth connection line 280 may be disposed between the battery 213 and the chiller 160.

One side of the fourth connection line 280 may be disposed in the second connection line 260, and the other side of the fourth connection line 280 may be disposed in the third connection line 270.

The fourth direction switching valve 261 may be disposed in the region in which the fourth connection line 280 and the second connection line 260 are connected. The second connection line 260 may be connected to two opposite sides of the fourth direction switching valve 261, and the fourth connection line 280 may be disposed in one region of the fourth direction switching valve 261.

In addition, the battery 213 may be disposed at the upper side of the third connection line 270, and the first pump 214 and the chiller 160 may be disposed at the lower side of the third connection line 270. The operation of the system according to the air conditioning mode will be described on the basis of the structural difference illustrated in FIG. 14.

The first to sixth air conditioning modes are identical to the above-mentioned modes. Because the refrigerant circulation line 100 according to the air conditioning mode of the vehicle heat pump system according to yet another embodiment of the present invention to be described below is identical to the above-mentioned refrigerant circulation line, the following description will be made on the basis of the coolant line.

Figure 15:
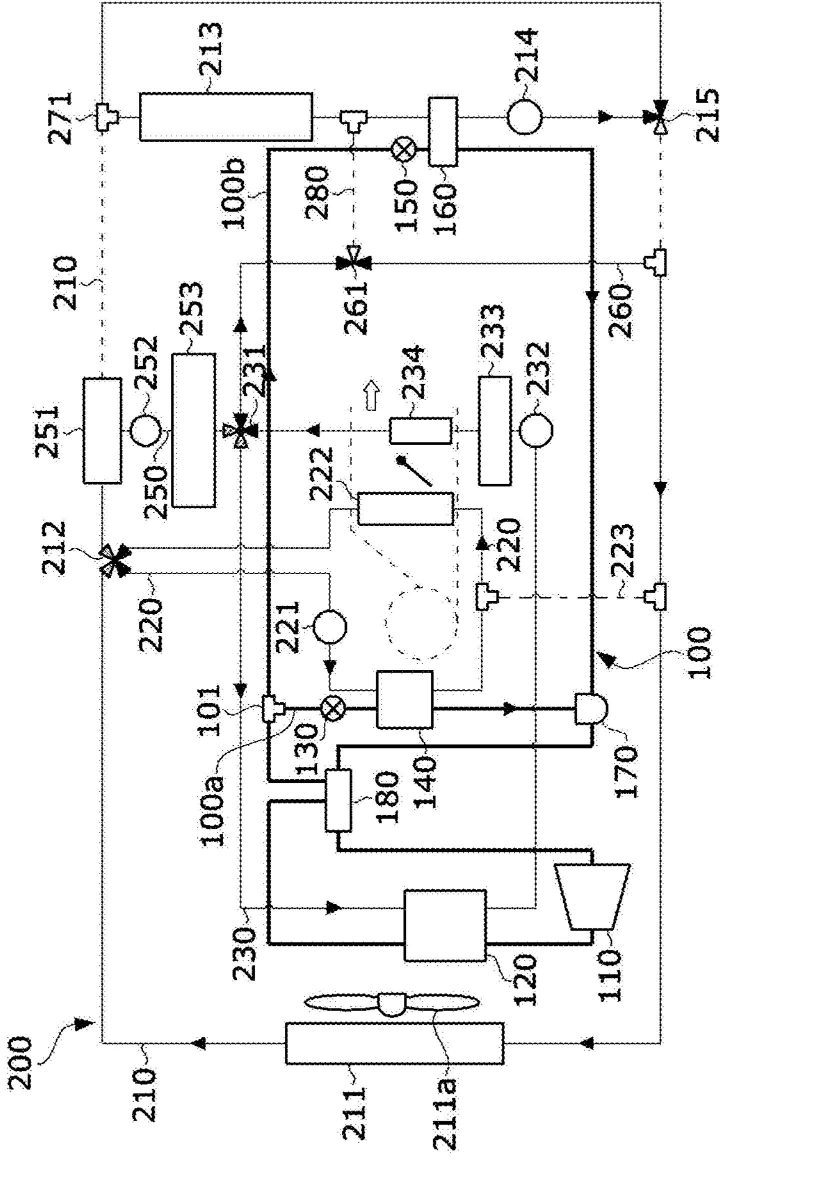
FIG. 15 is a view illustrating an operation in a first air conditioning mode in FIG. 14.

FIG. 15 is a view illustrating an operation in a first air conditioning mode in FIG. 14.

Referring to FIG. 15, in the first air conditioning mode, the coolant line 200 identical to that of the above-mentioned embodiment operates. In this case, the fourth direction switching valve 261 closes the fourth connection line 280, so that the operation identical to the operation of the coolant line 200 of the vehicle heat pump system according to the above-mentioned embodiment is performed.

Figure 16:
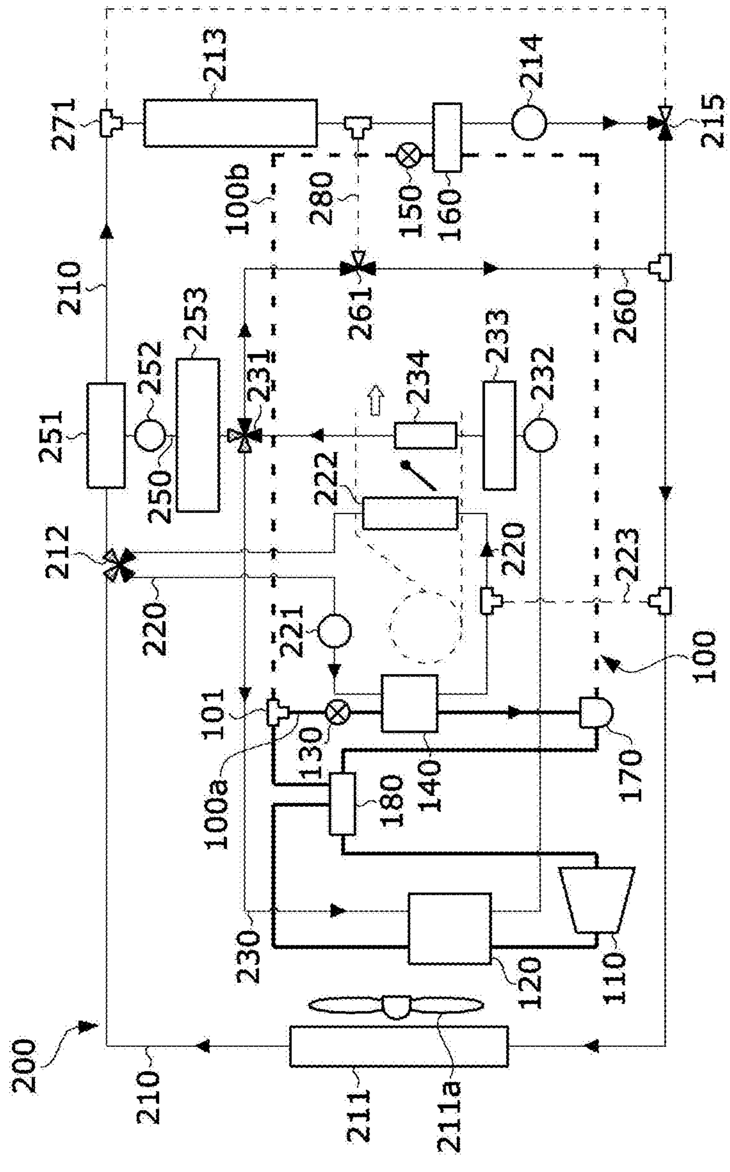
FIG. 16 is a view illustrating an operation in a second air conditioning mode in FIG. 14.

FIG. 16 is a view illustrating an operation in a second air conditioning mode in FIG. 14.

Referring to FIG. 16, the coolant in the coolant line 200 is circulated by the operations of the first to fourth pumps 214, 232, 221, and 221.

In this case, the first direction switching valve 212 may operate so that the refrigerating line 210 and the cooling line 220 are separated. The third direction switching valve 215 may operate to connect the third connection line 270 and close one region of the refrigerating line 210.

The coolant having passed through the electrical component 253 disposed in the first connection line 250 may pass through the second direction switching valve 231.

In this case, the second direction switching valve 231 connects the first connection line 250 to one region of the heating line 230, such that a temperature of the coolant having passed through the electrical component 253 is increased as the coolant passes through the water-cooled condenser 120. The coolant with the increased temperature is pumped by the second pump 232 and flows into the second direction switching valve 231 via the coolant heater 233 and the heater core 234.

The coolant introduced into the second direction switching valve 231 after passing through the water-cooled condenser 120 flows along the second connection line 260. The coolant may be cooled by the cooling fan 211*a* while passing through the radiator 211 and then introduced into the first direction switching valve 212 again. The coolant having passed through the first direction switching valve 212 may flow into the reservoir tank 251 and then circulate.

The coolant divided in the reservoir tank 251 flows along the refrigerating line 210. In this case, the coolant may flow along the third connection line 270 through the third direction switching valve 215 and the first coolant joint 271, flow through the battery 213, the chiller 160, and the first pump 214 disposed in the third connection line 270, and then flow to the radiator 211 along the refrigerating line 210.

In this case, the second refrigerant line of the refrigerant circulation line 100 does not operate. Therefore, the chiller 160 does not operate, the coolant passes through the chiller 160, and the battery 213 is cooled by the radiator 211.

Meanwhile, the coolant in the cooling line 220 circulates through the third pump 221. The coolant having performed the heat exchange while passing through the water-cooled evaporator 140 passes through the cabin cooler. The coolant passing through the cabin cooler 222 exchanges heat with the air blown by the air blower of the air conditioning device 190, such that the air is cooled. The cooled air is supplied to the vehicle interior and used to cool the vehicle interior.

Figure 17:
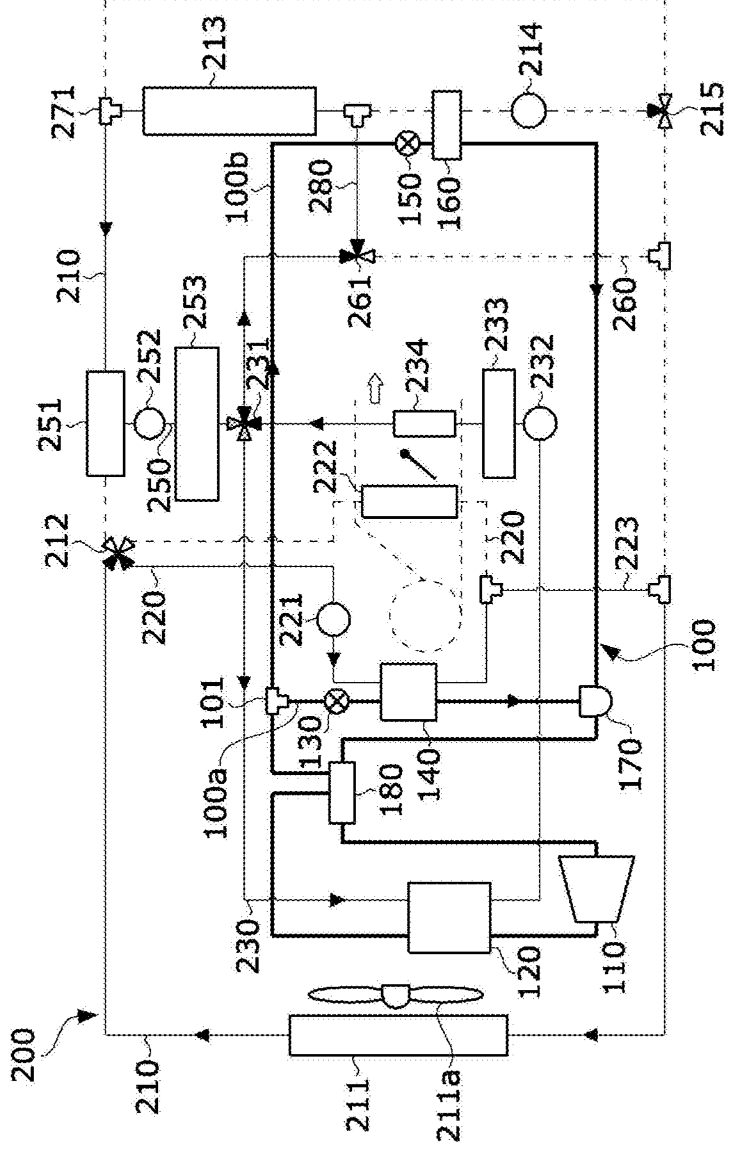
FIG. 17 is a view illustrating an operation in a third air conditioning mode in FIG. 14.

FIG. 17 is a view illustrating an operation in a third air conditioning mode in FIG. 14.

Referring to FIG. 17, in the third air conditioning mode, one region of the refrigerating line 210 of the coolant line 200 and one region of the cooling line 220 may be connected by the first direction switching valve 212.

The first direction switching valve 212 may connect the refrigerating line 210 adjacent to the radiator 211 and the cooling line 220 adjacent to the water-cooled evaporator 140 and operate to block the flow of the coolant between the refrigerating line 210 adjacent to the reservoir and the cooling line 220 adjacent to the cabin cooler 222.

The coolant having passed through the radiator 211 flows to the cooling line 220 through the first direction switching valve 212. The coolant having passed through the evaporator flows along the cooling connection line 223, flows into the radiator 211, and circulates. The circulation of the coolant may absorb heat from the outside air by means of the water-cooled evaporator 140. In this case, the first direction switching valve 212 may block the flow of the coolant flowing from the cooling line 220 to the cabin cooler 222.

The coolant flows into the second direction switching valve 231 via the electrical component 253. In this case, the second direction switching valve 231 connects the first connection line 250 to one region of the heating line 230, such that a temperature of the coolant having passed through the electrical component 253 is increased as the coolant passes through the water-cooled condenser 120. The coolant with the increased temperature is pumped by the second pump 232 and flows into the second direction switching valve 231 via the coolant heater 233 and the heater core 234.

The coolant introduced into the second direction switching valve 231 after passing through the water-cooled condenser 120 flows along the second connection line 260.

In this case, the fourth direction switching valve 261 operates so that the fourth connection line 280 and the second connection line 260 are connected, such that the coolant flows along the fourth line. The third direction switching valve 215 blocks the flow in the refrigerating line 210, such that the coolant flows to the battery 213.

The coolant having the temperature increased in the water-cooled condenser 120 may flow to the battery 213 in the third connection line 270 through the fourth direction switching valve 261, increase the temperature of the battery 213, flow into the reservoir tank 251, and then circulate through the refrigerating line 210 and the heating line 230.

In the structure described above, the coolant may bypass the first pump 214 when the temperature of the battery 213 increases, thereby preventing a reverse rotation of the first pump 214.

Figure 18:
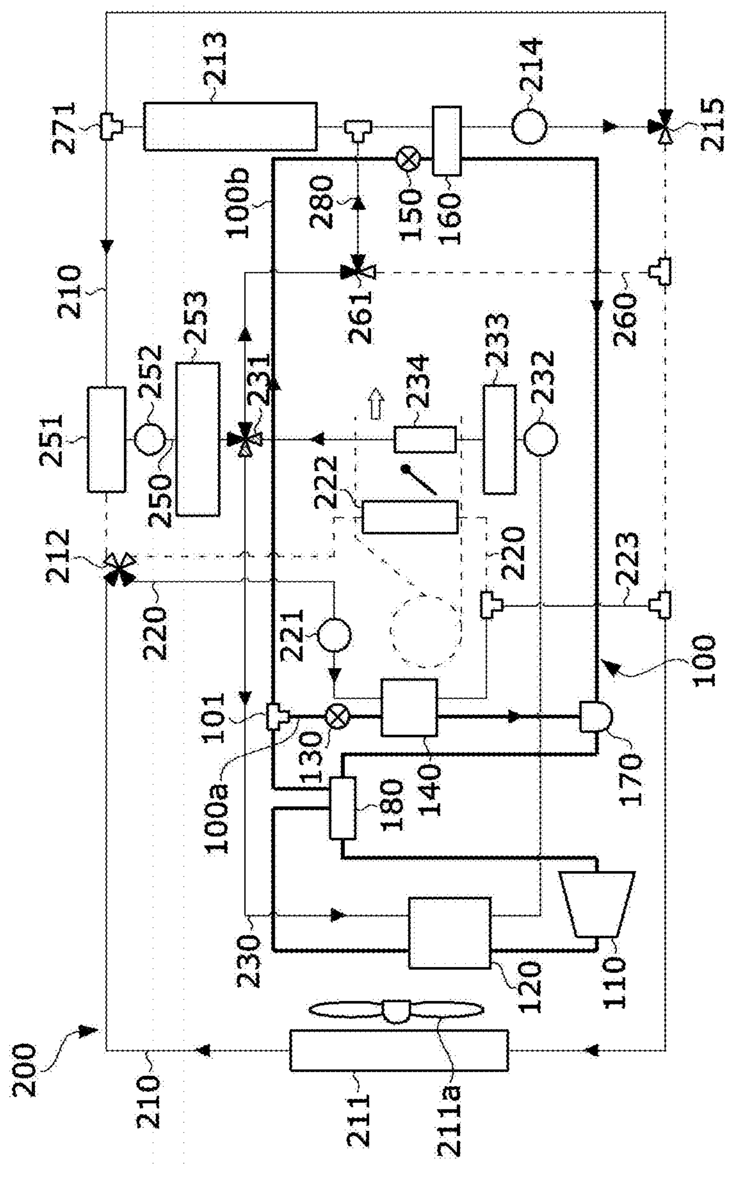
FIG. 18 is a view illustrating an operation in a fourth air conditioning mode in FIG. 14.

FIG. 18 is a view illustrating an operation in a fourth air conditioning mode in FIG. 14.

Referring to FIG. 18, in the fourth air conditioning mode, one region of the refrigerating line 210 of the coolant line 200 and one region of the cooling line 220 may be connected by the first direction switching valve 212.

The first direction switching valve 212 may connect the refrigerating line 210 adjacent to the radiator 211 and the cooling line 220 adjacent to the water-cooled evaporator 140 and operate to block the flow of the coolant between the refrigerating line 210 adjacent to the reservoir and the cooling line 220 adjacent to the cabin cooler 222.

The coolant having passed through the radiator 211 flows to the cooling line 220 through the first direction switching valve 212. The coolant having passed through the evaporator flows along the cooling connection line 223, flows into the radiator 211, and circulates. The circulation of the coolant may absorb heat from the outside air by means of the water-cooled evaporator 140. In this case, the first direction switching valve 212 may block the flow of the coolant flowing from the cooling line 220 to the cabin cooler 222.

The coolant having passed through the electrical component 253 disposed in the first connection line 250 flows into the second direction switching valve 231. In this case, the second direction switching valve 231 connects the first connection line 250 to one region of the heating line 230, such that a temperature of the coolant having passed through the electrical component 253 is increased as the coolant passes through the water-cooled condenser 120. The coolant with the increased temperature is pumped by the second pump 232 and flows into the second direction switching valve 231 via the coolant heater 233 and the heater core 234.

The coolant introduced into the second direction switching valve 231 after passing through the water-cooled condenser 120 flows along the second connection line 260.

In this case, the fourth direction switching valve 261 operates so that the fourth connection line 280 and the second connection line 260 are connected, such that the coolant flows along the fourth connection line 280 and is divided in the third connection line 270.

The coolant divided in the third connection line 270 to the battery 213 passes through the battery 213, flows into the reservoir tank 251, and then circulates.

The coolant divided in the third connection line 270 to the chiller 160 performs heat exchange in the chiller 160, flows along the refrigerating line 210 via the first pump 214 and the third direction switching valve 215, and flows into the reservoir tank 251.

The coolant flowing along the coolant line 200 may absorb waste heat of the electrical component 253 and the battery 213.

Figure 19:
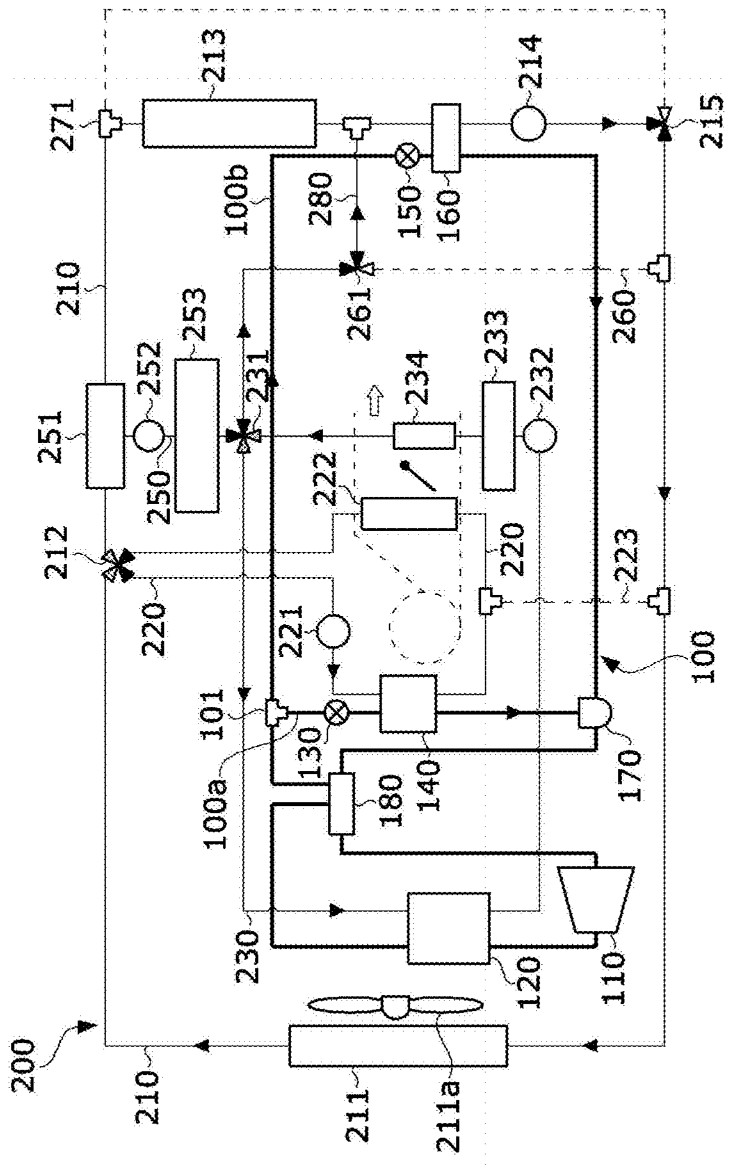
FIG. 19 is a view illustrating an operation in a fifth air conditioning mode in FIG. 14.

FIG. 19 is a view illustrating an operation in a fifth air conditioning mode in FIG. 14.

Referring to FIG. 19, in the fifth air conditioning mode, the coolant in the coolant line 200 is circulated by the operations of the first to fourth pumps 214, 232, 221, and 221.

The first direction switching valve 212 may operate so that the refrigerating line 210 and the cooling line 220 are separated.

The coolant may pass through the electrical component 253 disposed in the first connection line 250. The coolant having passed through the electrical component 253 may pass through the second direction switching valve 231.

In this case, the second direction switching valve 231 may control the flow of the coolant so that the heating line 230 independently circulates.

The coolant passing through the electrical component 253 may flow along the second connection line 260 and pass through the fourth direction switching valve 261.

In this case, the fourth direction switching valve 261 operates so that the fourth connection line 280 and the second connection line 260 are connected, such that the coolant flows along the fourth connection line 280 and is divided in the third connection line 270.

The coolant divided in the third connection line 270 to the battery 213 passes through the battery 213, flows into the reservoir tank 251, and then circulates.

The coolant divided in the third connection line 270 to the chiller 160 performs heat exchange in the chiller 160, flows along the refrigerating line 210 via the first pump 214 and the third direction switching valve 215, and flows to the radiator 211. The coolant flowing to the radiator 211 may be cooled by the cooling fan **211*a* and flow into the reservoir tank 251 via the first direction switching valve 212**.

The coolant in the cooling line 220 circulates through the third pump 221, and the coolant passes through the cabin cooler. The coolant passing through the cabin cooler 222 exchanges heat with the air blown by the air blower of the air conditioning device, and moisture in the air is removed as the coolant and the air exchange heat with each other.

Meanwhile, the coolant in the heating line 230 absorbs heat from the water-cooled condenser 120. The coolant passing through the water-cooled condenser 120 may heat the vehicle interior while defining a closed loop that circulates through the second direction switching valve 231 while passing through the second pump 232, the coolant heater 233, and the heater core 234.

Figure 20:
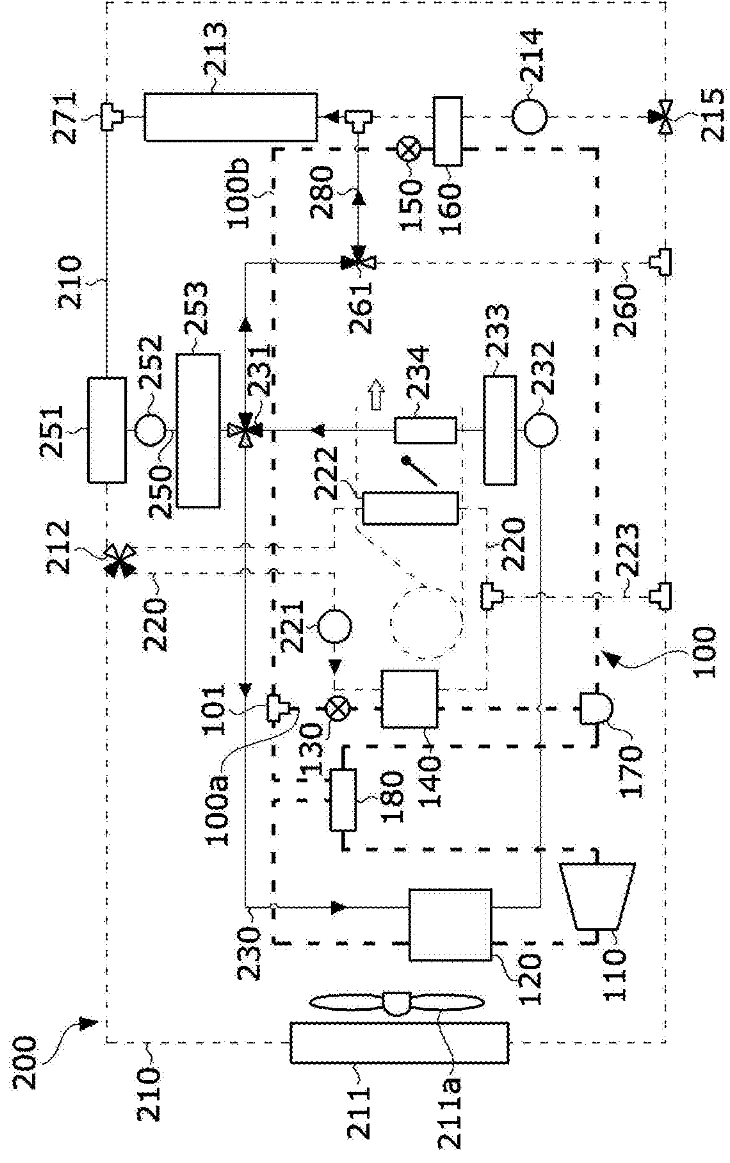
FIG. 20 is a view illustrating an operation in a sixth air conditioning mode in FIG. 8.

FIG. 20 is a view illustrating an operation in a sixth air conditioning mode in FIG. 14.

Referring to FIG. 20, in the sixth air conditioning mode, the operation of the refrigerant circulation line 100 is stopped.

One region of the refrigerating line 210 of the coolant line 200 and one region of the cooling line 220 may be connected by the first direction switching valve 212. The first direction switching valve 212 may connect the refrigerating line 210 adjacent to the radiator 211 and the cooling line 220 adjacent to the water-cooled evaporator 140 and operate to block the flow of the coolant between the refrigerating line 210 adjacent to the reservoir and the cooling line 220 adjacent to the cabin cooler 222. However, since the third pump 221 does not operate, the operation of the coolant line 200 connected through the first direction switching valve 212 may be stopped.

The coolant having passed through the electrical component 253 disposed in the first connection line 250 flows into the second direction switching valve 231. In this case, the second direction switching valve 231 connects the first connection line 250 and one region of the heating line 230 so that the coolant having passed through the electrical component 253 passes through the water-cooled condenser 120.

However, since the refrigerant circulation line 100 does not operate, the coolant passes through the water-cooled condenser 120, and the coolant is pumped by the second pump 232 and flows into the second direction switching valve 231 via the coolant heater 233 and the heater core 234.

The coolant introduced into the second direction switching valve 231 after passing through the water-cooled condenser 120 flows along the second connection line 260.

In this case, the fourth direction switching valve 261 operates so that the fourth connection line 280 and the second connection line 260 are connected, such that the coolant flows along the fourth connection line 280. In this case, the third direction switching valve 215 may block the flow of the coolant in the refrigerating line 210. Therefore, the coolant flowing along the third connection line 270 passes through the battery 213 and then flows from the first coolant joint 271 to the reservoir tank 251.

In this case, since the refrigerant circulation line 100 is stopped, the coolant heats the vehicle interior by using waste heat of the electrical component 253 and the battery 213.

The components indicated by the same reference numerals in the description of the vehicle heat pump system according to the embodiments of the present invention may perform the same functions, and the configurations and contents related to the embodiments may be carried out interchangeably.

FIGS. 21 to 25 relates to a vehicle heat pump system according to a fourth embodiment of the present invention.

Figure 21:
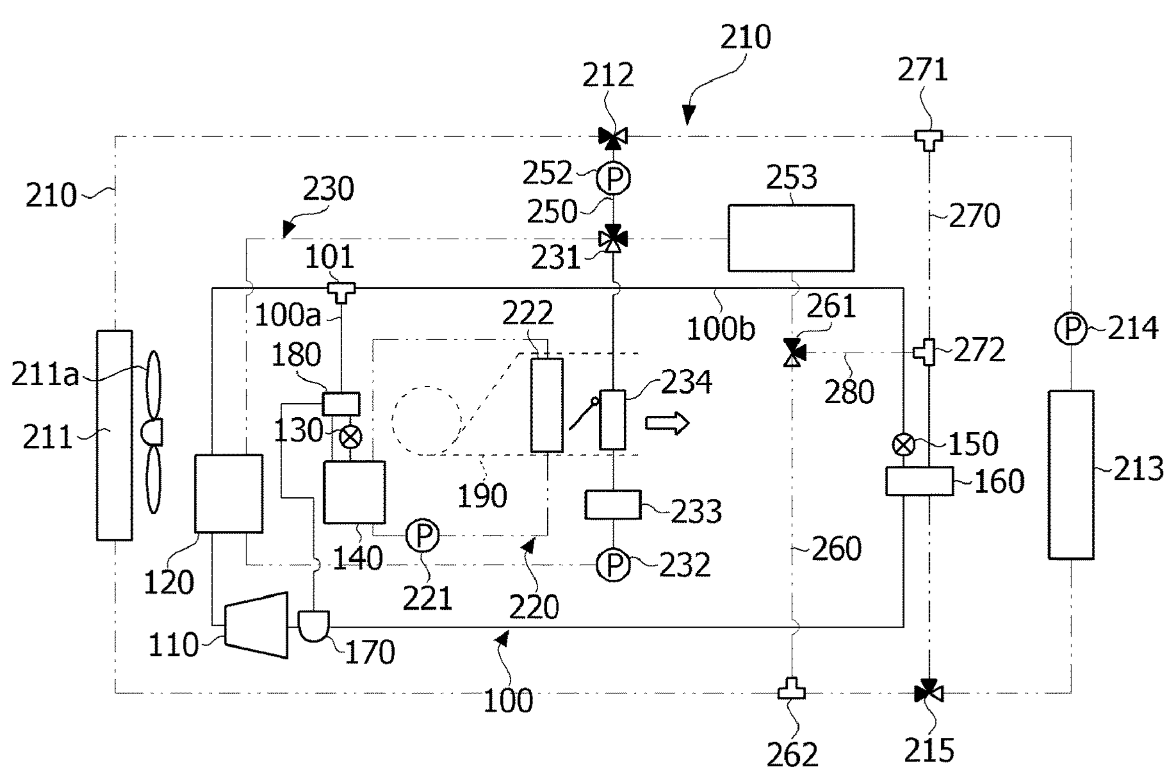
FIG. 21 is a structural view of a vehicle heat pump system according to a fourth embodiment of the present invention.

FIG. 21 is a structural view of a vehicle heat pump system according to a fourth embodiment of the present invention.

Referring to FIG. 21, the vehicle heat pump system according to the fourth embodiment of the present invention may include: the compressor 110 configured to compress and circulate the refrigerant; a first heat exchanger 120 configured to condense the compressed refrigerant; a first expansion valve 130 configured to expand the condensed refrigerant; a second heat exchanger 140 configured to evaporate the refrigerant expanded by the first expansion valve 130; a second expansion valve 150 configured to expand the condensed refrigerant; the chiller 160 configured to allow the coolant to exchange heat with the refrigerant expanded by the second expansion valve 150; a heat-dissipation heat exchanger 211 configured to allow the coolant to exchange heat with outside air; and the electrical component 253 configured to be cooled by the coolant. In the heating mode, the coolant having passed through the heat-dissipation heat exchanger 211 may exchange heat with the electrical component 253 and then flow into the chiller 160, thereby improving heating performance.

Hereinafter, the condenser 120 will be described as an example of the first heat exchanger, the evaporator 140 will be described as an example of the second heat exchanger, the radiator 211 will be described as an example of the heat-dissipation heat exchanger, and the battery 213 will be described as an example of the heat generating component.

The vehicle heat pump system according to the embodiment of the present invention may include the refrigerant circulation line 100 configured to circulate the refrigerant and cool the vehicle interior; and the coolant circulation line 200 configured to circulate the coolant, heat the vehicle interior, and cool the components. Further, the coolant circulation line 200 may include the heating line 230 configured to heat the vehicle interior, and the refrigerating line 210 configured to cool the electrical component 253 and the battery 213.

The refrigerant circulation line 100 may include the compressor 110, the condenser 120, the refrigerant branch part 101, the first refrigerant line 100*a* branching off from the refrigerant branch part 101 toward one side and configured to pass through the first expansion valve and the evaporator 140, the second refrigerant line 100*b* branching off from the refrigerant branch part 101 toward the other side and configured to pass through the second expansion valve 160 and the chiller 160, and the accumulator 170 through which the refrigerant having passed through the first refrigerant line 100*a* and the second refrigerant line 100*b* passes. The refrigerant having passed through the accumulator 170 flows into the compressor 110 again, such that refrigerant circulation is implemented.

In this case, the refrigerant heat exchanger 180 may be disposed in the first refrigerant line 100*a*. The refrigerant heat exchanger may be disposed between the refrigerant branch part 101 and the first expansion valve 130, such that the refrigerant introduced into the first expansion valve 130 may exchange heat with the refrigerant having passed through the evaporator 140.

The compressor 110 operates by receiving power from an engine (internal combustion engine) or a motor. The compressor sucks the refrigerant, compresses the refrigerant into a high-temperature, high-pressure gaseous refrigerant, and then discharges the refrigerant to the condenser 120.

The condenser 120 serves as a condenser in both the cooling mode and the heating mode. The refrigerant flowing through the condenser 120 exchanges heat with the coolant in the coolant circulation line 200 to be described below and then flows to the first expansion valve 130. As described above, the coolant heated by the refrigerant in the condenser 120 may be supplied to an interior heat exchanger through the coolant circulation line 200. In one embodiment, a water-cooled condenser 120 may be used as the condenser 120.

The refrigerant branch part 101 distributes the refrigerant to the first refrigerant line 100*a* and the second refrigerant line 100*b*.

The first expansion valve 130 and the evaporator 140 may be disposed in the first refrigerant line 100*a*.

The first expansion valve 130 may throttle the refrigerant introduced from the first refrigerant line 100*a*, perform a bypass operation on the refrigerant, or block a flow of the refrigerant. The first expansion valve 130 may be disposed at a side adjacent to the inlet of the evaporator 140 based on the flow direction of the refrigerant.

The evaporator 140 is installed in an air conditioning casing and disposed in the first refrigerant line 100*a*. During a process in which the refrigerant discharged from the first expansion valve 130 is supplied to the evaporator 140 and air flowing in the air conditioning casing by a blower passes through the evaporator 140, the air exchanges heat with the low-temperature, low-pressure refrigerant in the evaporator 140 and is converted into cold air. The cold air is discharged into a vehicle interior and cools an occupant compartment.

The second expansion valve 160 and the chiller 160 may be disposed in the second refrigerant line 100*b*.

The second expansion valve 160 may throttle the refrigerant introduced from the second refrigerant line 100*b*, perform a bypass operation on the refrigerant, or block a flow of the refrigerant. The second expansion valve may be disposed at a side adjacent to the inlet of the chiller 160 based on the flow direction of the refrigerant.

The low-temperature, low-pressure refrigerant discharged from the second expansion valve 160 is supplied to the chiller 160 and exchanges heat with the coolant flowing in the coolant circulation line 200. The cold coolant made by heat exchange in the chiller 160 may circulate through the coolant circulation line 200 and exchange heat with the high-temperature battery 213. That is, the battery 213 exchanges heat with the coolant instead of exchanging heat with the refrigerant.

The accumulator 170 is installed at a side adjacent to an inlet of the compressor 110. The refrigerant having passed through the evaporator 140 and/or the chiller 160 merges into the accumulator 170. The accumulator 170 may divide the refrigerant into a liquid refrigerant and a gaseous refrigerant and supply only the gaseous refrigerant to the compressor 110.

The refrigerant heat exchanger 180 allows the refrigerant introduced into the first expansion valve 130 and the refrigerant discharged from the evaporator 140 to exchange heat with each other, thereby improving cooling performance. In this case, an inlet side refrigerant line configured to connect the refrigerant branch part 101 and the first expansion valve 130 and configured such that the refrigerant is introduced into the evaporator 140 therethrough passes through the refrigerant heat exchanger 180, and an outlet side refrigerant line configured to connect the evaporator 140 and the accumulator 170 and configured such that the refrigerant is discharged from the evaporator 140 therethrough passes through the refrigerant heat exchanger 180, such that the refrigerant passing through the inlet side refrigerant line and the refrigerant passing through the outlet side refrigerant line may exchange heat with each other.

Therefore, before the refrigerant is introduced into the first expansion valve 130, the refrigerant may be further cooled by the refrigerant heat exchanger 180, thereby improving cooling performance implemented by the evaporator 140 and improving efficiency of the cooling system. In particular, the refrigerant heat exchanger 180 and the chiller 160 are connected in parallel.

That is, the refrigerant heat exchanger 180 is not disposed in series between the condenser 120 and the chiller 160 in the refrigerant line, but the refrigerant heat exchanger 180 is disposed adjacent to the evaporator 140, such that the refrigerant heat exchanger 180 and the evaporator 140 may be disposed and connected in series. If the refrigerant heat exchanger is disposed in series between the water-cooled condenser 120 and the chiller 160, the heating performance may decrease because a pressure drop occurs at a low-pressure side in the heating mode. On the contrary, when the refrigerant heat exchanger is connected in parallel, both the cooling performance and the heating performance increase. This is because there is no refrigerant heat exchanger between the condenser 120 and the chiller 160 in the flow of the refrigerant in the heating mode.

The coolant circulation line 200 may include the heating line 230 configured to heat the vehicle interior, and the refrigerating line 210 and the second cooling line configured to cool the electrical component 253 and the battery 213.

In this case, the cooling line 220 may include the evaporator 140, the cabin cooler 222, and the third pump 221. In this case, the coolant line, which connects the evaporator 140, the cabin cooler 222, and the third pump 221 may define a closed loop.

As described above, the refrigerant and the coolant may exchange heat with each other while passing through the evaporator 140.

The cabin cooler 222 serves as an air-cooled evaporator 140. The coolant cooled by exchanging heat with the refrigerant passing through the evaporator 140 passes through the cabin cooler 222. Further, the cabin cooler 222 is disposed in the air conditioning device 190. The air flowing by the air blower of the air conditioning device 190 is cooled while passing through the cabin cooler 222, supplied to the vehicle interior, and used to cool the vehicle interior.

The third pump 221 serves to pump the coolant so that the coolant circulates along the cooling line 220. Further, the third pump 221 may be installed in the coolant line and disposed between the evaporator 140 and the cabin cooler 222. The operation of the third pump 221 may circulate the coolant.

Therefore, the vehicle heat pump system according to the present invention adopts the cooling line 220 using the coolant for cooling the vehicle interior, such that the refrigerant circulation line 100 through which the refrigerant circulates may be disposed outside the vehicle interior instead of being disposed in the vehicle interior. Therefore, it is possible to reduce a length of the refrigerant pipe, reduce the amount of refrigerant, and modularize the components in the refrigerant circulation line 100. In addition, a high-efficiency natural refrigerant may be used as the refrigerant used for the refrigerant circulation line 100, which may improve the efficiency of the thermal management system.

The heating line 230 may include the condenser 120, a second pump 232, a coolant heater 233, a heater core 234, and a second direction switching valve 231.

As described above, the refrigerant and the coolant may exchange heat with each other while passing through the condenser 120.

The second pump 232 is a means for pumping the coolant so that the coolant circulates along the heating line 230. The second pump 232 may be installed in the coolant line and disposed rearward of the condenser 120 based on the flow direction of the coolant.

The coolant heater 233 refers to a device for heating the coolant. The coolant heater 233 is connected and disposed rearward of the second pump 232 and forward of the heater core 234 based on the flow direction of the coolant. Further, the coolant heater 233 may operate when a temperature of the coolant is equal to or lower than a particular temperature. Various components such as an induction heater, a sheath heater, a PTC heater, or a film heater capable of generating heat using electric power may be used as the coolant heater 233.

The heater core 234 may be disposed in an air conditioning device 190 of the vehicle. The air flowing by the air blower may be heated while passing through the heater core 234, supplied to the vehicle interior, and used to heat the vehicle interior. Further, the heater core 234 may be connected and disposed rearward of the coolant heater 233 based on the flow direction of the coolant.

The second direction switching valve 231 may be installed between the heater core 234 and the condenser 120 and configured to selectively connect or disconnect the heating line 230 and the refrigerating line 210 to be described below.

More specifically, the second direction switching valve 231 may be installed in the heating line 230. Two coolant line pipes may be connected to the second direction switching valve 231. The single first connection line 250 branching off from one side of the refrigerating line 210 may be connected to the second direction switching valve 231. The single second connection line 260 branching off from the other side of the refrigerating line 210 may be connected to the second direction switching valve 231. That is, four coolant lines may be connected to the second direction switching valve 231 so as to meet together. The second direction switching valve 231 may be a 4-way direction switching valve capable of adjusting states in which the four coolant lines are connected to or disconnected from one another.

The refrigerating line 210 may include a radiator 211, a first direction switching valve 212, a fourth pump 252, a second direction switching valve 231, the electrical component 253, a first coolant joint 271, a second coolant joint 262, a first pump 214, the battery 213, the chiller 160, and a third direction switching valve 215.

The radiator 211 cools the coolant having exchanged heat with the electrical component 253 or the battery 213. The radiator 211 may be cooled by a cooling fan **211*a*** in an air-cooled manner.

The first direction switching valve 212 may be installed in the refrigerating line 210. Two coolant pipes may be connected to the first direction switching valve 212. The second direction switching valve 231 and the first direction switching valve 212 may be connected by the first connection line 250 so that the heating line 230 and the refrigerating line 210 are connected.

That is, three coolant lines may be connected to the first direction switching valve 212 so as to meet together. The first direction switching valve 212 may be a 3-way direction switching valve capable of adjusting states in which the three coolant lines are connected to or disconnected from one another.

The fourth pump 252 is a means for pumping the coolant so that the coolant circulates along the refrigerating line 210. Further, the fourth pump 252 is installed in the first connection line 250 and disposed between the second direction switching valve 231 and the first direction switching valve 212. The operation of the fourth pump 252 may allow the coolant to flow from the first direction switching valve 212 to the second direction switching valve 231.

The second direction switching valve 231 is as described above with reference to the heating line 230.

The electrical component 253 is disposed in a second connection line 260 that connects the second direction switching valve 231 and the second coolant joint 262. The electrical component 253 may be cooled by the coolant. Further, the electrical component 253 may be a drive motor, an inverter, a charger (onboard charger (OBC)), or the like.

The first pump 214 is a means for pumping the coolant so that the coolant circulates along the refrigerating line 210. Further, the first pump 214 is installed in the coolant line and disposed between the first coolant joint 271 and the battery 213, such that the coolant may flow from the first pump 214 to the battery 213.

The battery 213 serves as a power source for the vehicle. The battery 213 may serve as a driving source for various types of electrical components 253 in the vehicle. In addition, the battery 213 may be connected to a fuel cell and serve to store electricity. Alternatively, the battery 213 may serve to store electricity supplied from the outside. Further, the battery 213 may be disposed in the coolant line and provided between the first pump 214 and the third direction switching valve 215. Therefore, the battery 213 may be cooled or heated by exchanging heat with the flowing coolant.

The first coolant joint 271 is installed in the coolant line and disposed rearward of the first direction switching valve 212 based on the flow direction of the coolant. Three coolant lines are connected to the first coolant joint 271 so as to meet together. That is, the first coolant joint 271 may be installed such that two opposite sides thereof are connected to the refrigerating line 210, and a third connection line 270 may be connected to a lower side of the first coolant joint 271. In this case, the third connection line 270 may be connected to pass through the chiller 160.

The second coolant joint 262 may be installed at a point at which a rear end of the second connection line 260 meets the refrigerating line 210. Three coolant lines are connected to the second coolant joint 262 so as to meet together. That is, the second coolant joint 262 may be installed such that two opposite sides thereof are connected to the refrigerating line 210, and the second connection line 260 may be connected to an upper side of the second coolant joint 262.

The chiller 160 is as described above with reference to the heating line 230.

The third direction switching valve 215 may be installed in the coolant line and disposed between the battery 213 and the second coolant joint 262. Two coolant pipes may be connected to the third direction switching valve 215. The third connection line 270 may be connected to an upper side of the third direction switching valve 215, such that the battery 213 and the third connection line 270 may be connected in parallel. In this case, the first direction switching valve 212 may be a 3-way direction switching valve capable of adjusting states in which the three coolant lines are connected to or disconnected from one another.

Further, the air blower may be installed at one side of the air conditioning device 190 to blow air. A temperature adjustment door may be installed in the air conditioning device 190. In addition, the evaporator 140 and the heater core 234 disposed in the air conditioning device 190 may be disposed and configured such that on the basis of the operation of the temperature adjustment door, the air discharged from the air blower may flow into the vehicle interior while passing only through the evaporator 140 or flow into the vehicle interior while passing through the evaporator 140 and then passing through the heater core 234.

In addition, the fourth direction switching valve 261 may be disposed in the second connection line 260 and control the flow direction of the coolant having passed through the electrical component 253. The fourth direction switching valve 261 is disposed in the fourth connection line 280 branching off from the second connection line 260. The fourth connection line 280 may be connected to a third coolant joint 272 disposed in the third connection line 270.

The third coolant joint 272 is disposed at a side adjacent to an inlet of the chiller 160 through which the coolant is introduced. The coolant having passed through the electrical component 253 may be introduced into the chiller 160 according to the operation of the fourth direction switching valve 261.

In one embodiment, when the upper side and the right side of the fourth direction switching valve 261 are connected, the electrical component 253 and the chiller 160 may be connected in series.

Figure 22:
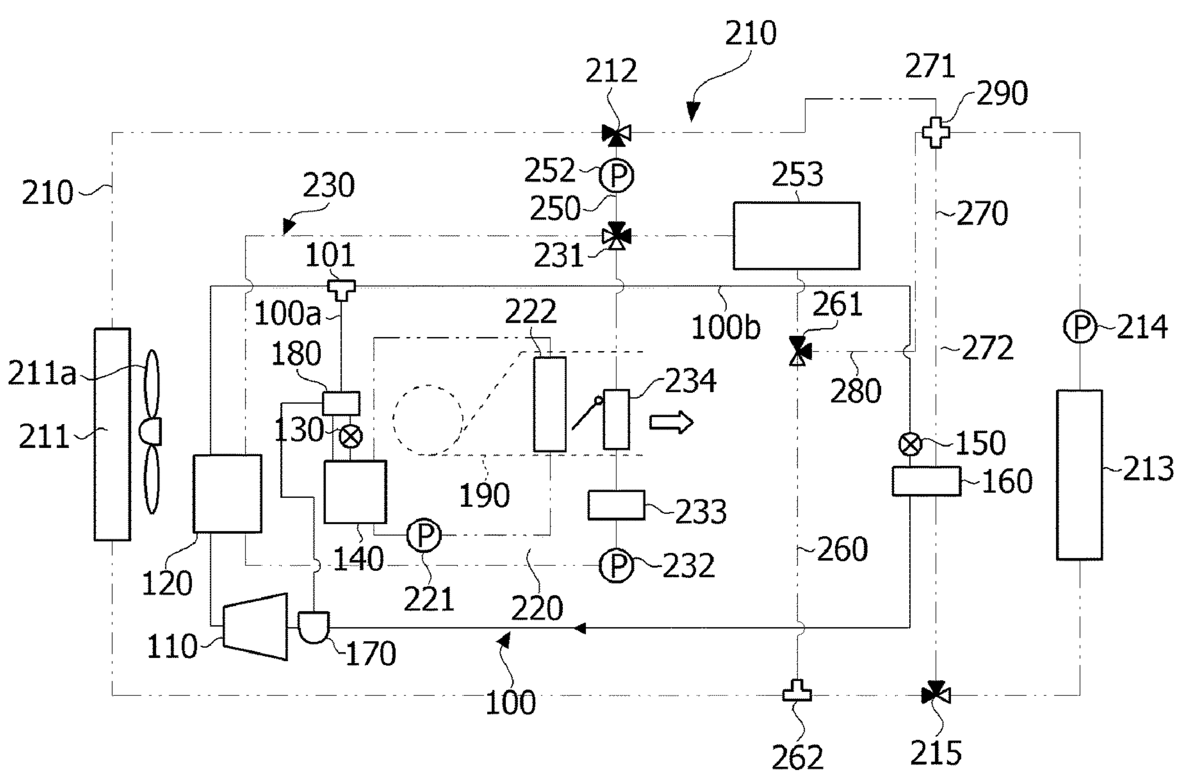
FIG. 22 is a view illustrating a first embodiment of FIG. 21.

FIG. 22 is a view illustrating a first embodiment of FIG. 21.

Referring to FIG. 22, the vehicle heat pump system illustrated in FIG. 22 has a structure in which the first coolant joint 271 and the third coolant joint 272 are connected as a single component.

An integrated coolant joint 273 configured by connecting the first coolant joint 271 and the third coolant joint 272 may be connected to four coolant flow paths.

The integrated coolant joint 273 may be connected to the chiller 160, the first pump 214, the first direction switching valve 212, and the fourth connection line 280 connected to the fourth direction switching valve 261. The flow paths of the integrated coolant joint 273 may be controlled by the first direction switching valve 212, the third direction switching valve 215, and the fourth direction switching valve 261.

Figure 23:
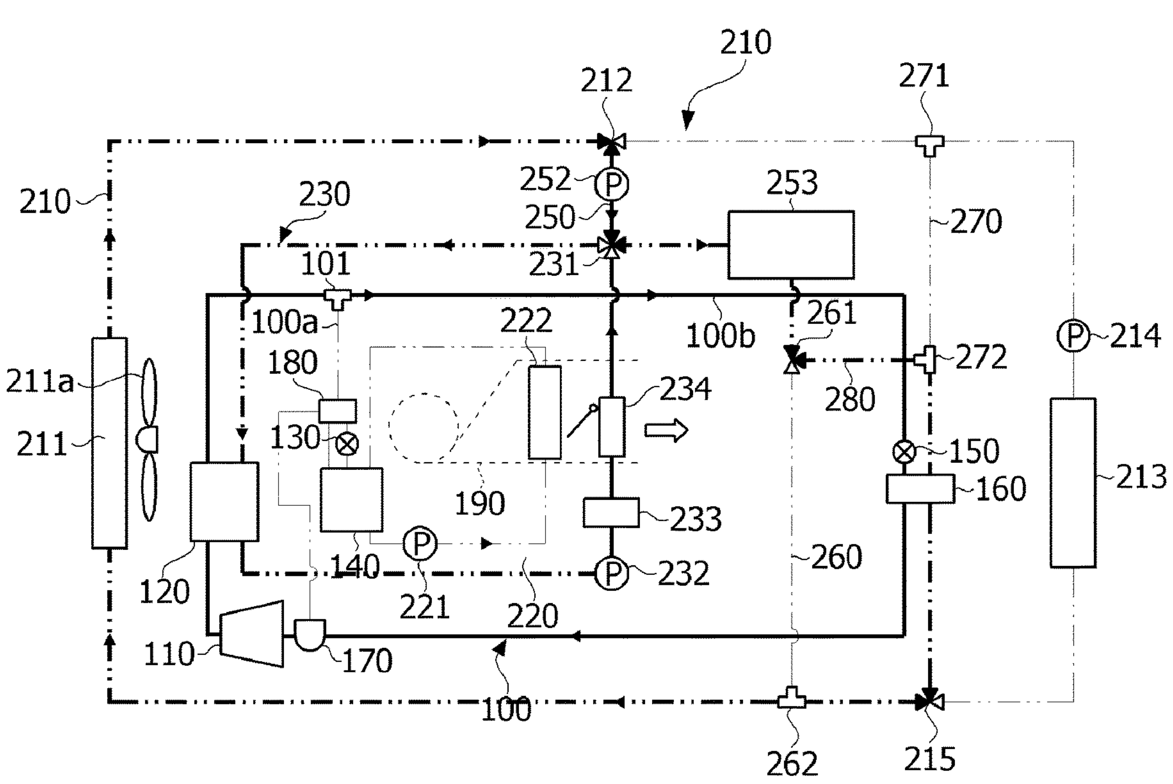
FIG. 23 is a view illustrating an operating state of the system in a maximum heating mode in FIG. 21.

FIG. 23 is a view illustrating an operating state of the system in a maximum heating mode.

Referring to FIG. 23, in the refrigerant circulation line 100, the compressor 110 operates, and the high-temperature, high-pressure refrigerant is discharged from the compressor 110. Further, the refrigerant discharged from the compressor 110 is cooled while exchanging heat with the coolant in the condenser 120. Thereafter, the refrigerant cooled in the condenser 120 passes through the refrigerant branch part 101 and is throttled and expanded while passing through the second expansion valve 160. Thereafter, the expanded refrigerant flows into the chiller 160 and exchanges heat with the coolant in the chiller 160, such that the coolant may be cooled, and the refrigerant may heated. Next, the refrigerant having passed through the chiller 160 flows into the compressor 110 again via the accumulator 170.

In this case, the first expansion valve 130 is closed, such that the refrigerant may not flow to the evaporator 140. Therefore, the refrigerant circulates as the above-mentioned process is repeated.

In addition, in the cooling line 220, the third pump 221 does not operate, such that the coolant may not flow in the cooling line 220.

Meanwhile, the coolant in the coolant circulation line 200 is circulated by the operations of the second pump 232 and the fourth pump 252. Further, the coolant may be heated while passing through the condenser 120, heated by the coolant heater 233, and heated by waste heat of the electrical component 253. The coolant may be cooled while passing through the chiller 160. In this case, the second direction switching valve 231 and the first direction switching valve 212 may adjust the directions thereof so that the heating line 230 and the refrigerating line 210 are separated. More specifically, the coolant may flow as the upper side and the right side of the second direction switching valve 231 are connected to each other, and the coolant may flow as the lower side and the left side of the second direction switching valve 231 are connected to each other. Further, when the left side and the lower side of the first direction switching valve 212 are connected to each other, the coolant may flow, and the right side of the first direction switching valve 212 may be disconnected. In addition, the upper side and the left side of the third direction switching valve 215 may be connected to each other, and the right side of the third direction switching valve 215 may be blocked.

Therefore, the coolant in the heating line 230 sequentially passes through the second pump 232, the coolant heater 233, the heater core 234, the second direction switching valve 231, and the condenser 120, flows into the second pump 232 again, and circulates. This cycle is repeated. In this case, the coolant passes through the heater core 234 while exchanging heat with the air blown by the air blower of the air conditioning device 190, such that the air is heat. The heated air is supplied to the vehicle interior and used to heat the vehicle interior.

Further, the coolant in the refrigerating line 210 separated from the heating line 230 flows from the fourth pump 252 to the second direction switching valve 231, the electrical component 253, the fourth direction switching valve 261, the third coolant joint 272, the chiller 160, the third direction switching valve 215, the radiator 211, and the first direction switching valve 212, flows into the fourth pump 252, and then circulates. This cycle is repeated.

In this case, the upper side and the right side of the fourth direction switching valve 261 may be connected to each other so that the coolant flows to the chiller 160. The coolant flows to the chiller 160 via the third coolant joint 272.

Therefore, the electrical component 253 and the chiller 160 may be connected in series, and a coolant flow path capable of absorbing both outside air and waste heat may be formed. In this structure, since there is no branch part in the refrigerating line 210 circulating through the radiator 211, the electrical component, and the chiller 160, the coolant may flow at an almost constant flow rate, which may improve the heating performance.

In this case, the coolant may not flow to the battery 213 through the first direction switching valve 212 and the third direction switching valve 215.

Figure 24:
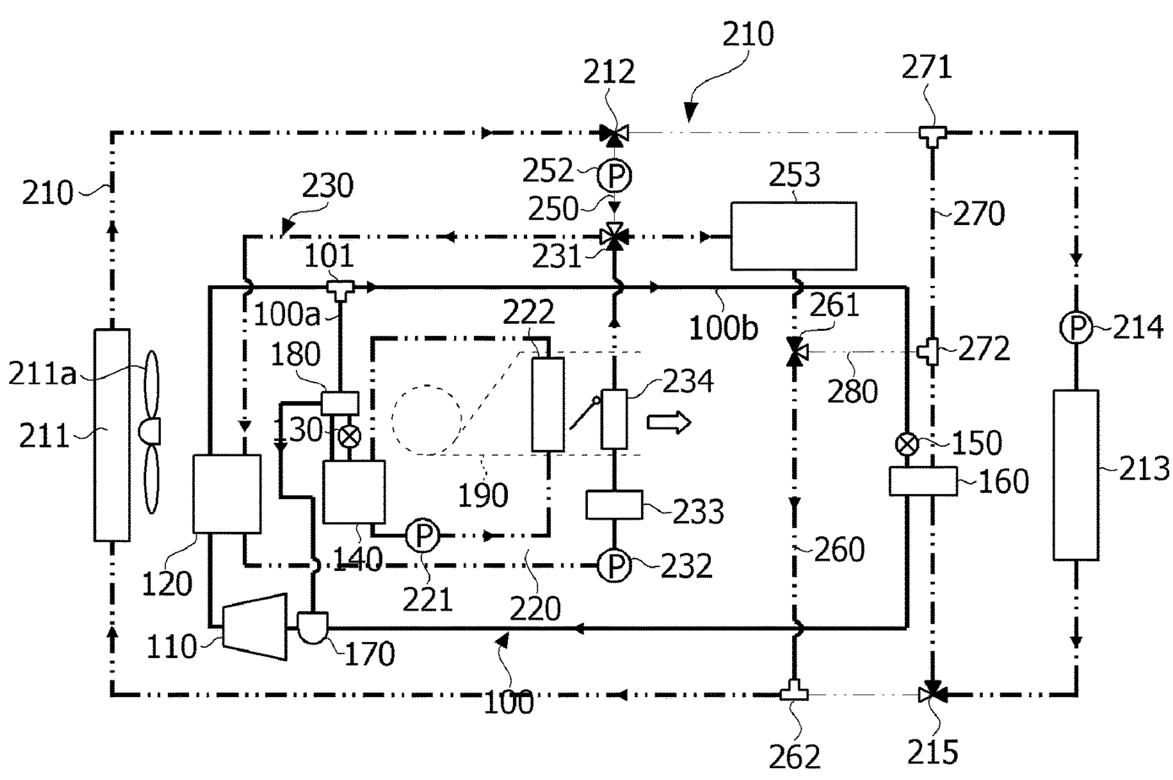
FIG. 24 is a view illustrating an operating state of the system in a cooling mode in FIG. 21.

FIG. 24 is a view illustrating an operating state of the system in the cooling mode.

Referring to FIG. 24, in the refrigerant circulation line 100, the compressor 110 operates, and the high-temperature, high-pressure refrigerant is discharged from the compressor 110. Further, the refrigerant discharged from the compressor 110 is cooled while exchanging heat with the coolant in the condenser 120. Thereafter, the refrigerant cooled and condensed in the water-cooled condenser 120 is divided in the refrigerant branch part 101. A part of the refrigerant passes through the refrigerant heat exchanger 180 and then be throttled and expanded while passing through the first expansion valve 130. Thereafter, the expanded refrigerant exchanges heat with the coolant in the cooling line 220 while passing through the evaporator 140, and the coolant in the cooling line 220 is cooled by the refrigerant.

Further, the refrigerant evaporated in the evaporator 140 passes through the refrigerant heat exchanger 180, exchanges heat with the refrigerant before the refrigerant is introduced into the first expansion valve 130, and then flows into the compressor 110 again via the accumulator 170.

In addition, the remaining part of refrigerant divided in the refrigerant branch part 101 is throttled and expanded while passing through the second expansion valve 160. Thereafter, the expanded refrigerant is evaporated by exchanging heat with the coolant while passing through the chiller 160, such that the coolant may be cooled. Further, the refrigerant evaporated in the chiller 160 flows into the compressor 110 again via the accumulator 170.

As described above, the refrigerant having passed through the evaporator 140 and the refrigerant having passed through the chiller 160 merge with each other in the accumulator 170 and flow into the compressor 110. The refrigerant circulates as the above-mentioned process is repeated.

In addition, the coolant is circulated in the cooling line 220 by the operation of the third pump 221. Further, the coolant passes through the cabin cooler 222 while exchanging heat with the air blown by the air blower of the air conditioning device 190, such that the air is cooled. The cooled air is supplied to the vehicle interior and used to cool the vehicle interior.

Meanwhile, the coolant in the coolant circulation line 200 is circulated by the operations of the second pump 232, the fourth pump 252, and the first pump 214. Further, the battery 213, the electrical component 253, and the refrigerant passing through the condenser 120 may be cooled by the coolant. The heated coolant may be cooled while exchanging heat with the outside air by the operation of the cooling fan **211*a* of the radiator 211** for the electrical component.

In this case, the second direction switching valve 231 and the first direction switching valve 212 may adjust the directions thereof so that the heating line 230 and the refrigerating line 210 are connected. More specifically, the coolant may flow as the upper side and the left side of the second direction switching valve 231 are connected to each other, and the coolant may flow as the lower side and the right side of the second direction switching valve 231 are connected to each other. Further, when the left side and the lower side of the first direction switching valve 212 are connected to each other, the coolant may flow, and the right side of the first direction switching valve 212 may be disconnected. In addition, the upper side and the right side of the third direction switching valve 215 may be connected to each other, and the left side of the third direction switching valve 215 may be blocked.

Therefore, the coolant flows from the radiator 211 for the electrical component sequentially to the first direction switching valve 212, the fourth pump 252, the second direction switching valve 231, the condenser 120, the second pump 232, the coolant heater 233, the heater core 234, the second direction switching valve 231, the electrical component 253, and the second coolant joint 262, flows into the radiator 211 for the electrical component again, and circulates. This cycle is repeated.

In this case, the right line of the fourth direction switching valve 261 may be closed, thereby preventing the coolant from flowing to the fourth connection line 280.

The first direction switching valve 212 may prevent the coolant from flowing from the first direction switching valve 212 to the first coolant joint 271, and the third direction switching valve 215 may prevent the coolant from flowing from the third direction switching valve 215 to the second coolant joint 262.

In addition, the coolant may flow from the chiller 160 sequentially to the first coolant joint 271, the first pump 214, the battery 213, and the third direction switching valve 215, flows into the chiller 160 again, and circulates. This cycle is repeated. That is, the battery 213 and the chiller 160 may define a separate closed loop, in which the coolant circulates, in the refrigerating line 210 by the first direction switching valve 212 and the third direction switching valve 215, such that the battery 213 may be separately cooled.

Figure 25:
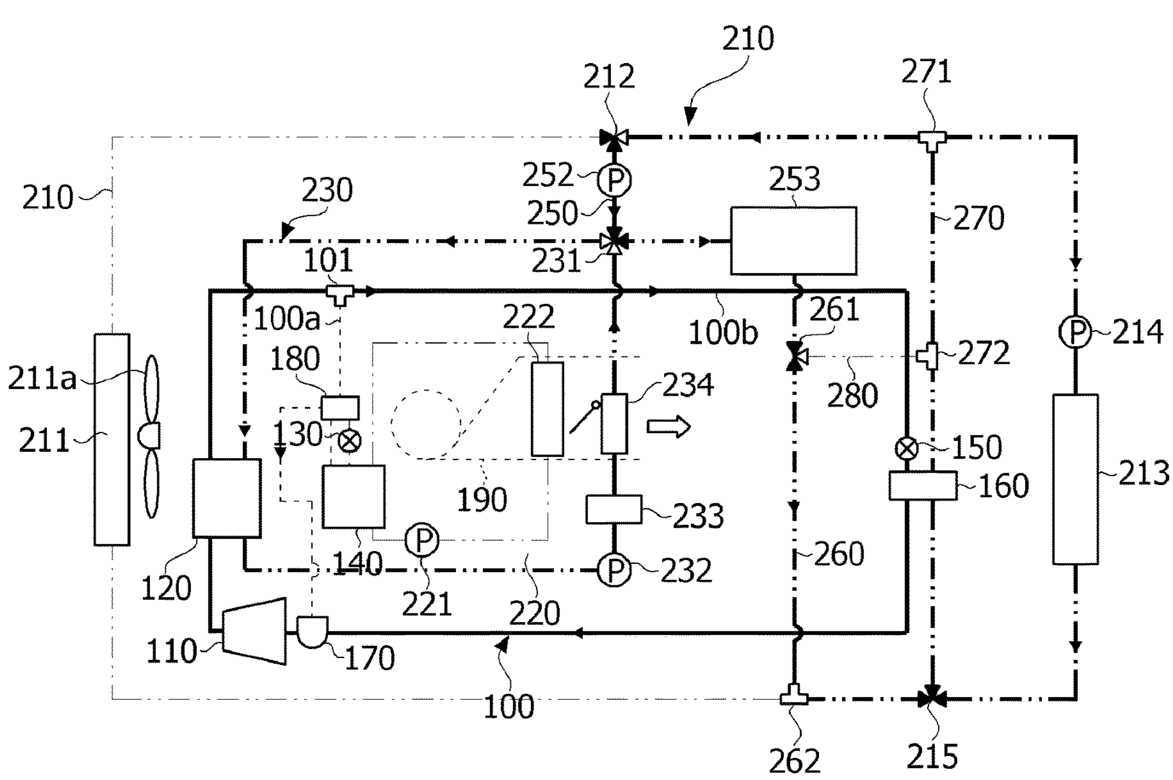
FIG. 25 is a view illustrating an operating state of the system in a general heating mode.

FIG. 25 is a view illustrating an operating state of the system in a general heating mode.

Referring to FIG. 25, in the refrigerant circulation line 100, the compressor 110 operates, and the high-temperature, high-pressure refrigerant is discharged from the compressor 110. Further, the refrigerant discharged from the compressor 110 is cooled while exchanging heat with the coolant in the condenser 120.

The first expansion valve 130 is closed, such that the refrigerant does not pass through the first refrigerant line 100*a* in which the refrigerant heat exchanger 180 and the evaporator 140 are disposed. The refrigerant passes through the refrigerant branch part 101 and the third expansion valve and flows into the chiller 160. In the chiller 160, the refrigerant and the coolant exchange heat with each other, such that the refrigerant may be heated.

The refrigerant having passed through the chiller 160 flows into the compressor 110 again via the accumulator 170.

In addition, in the cooling line 220, the third pump 221 does not operate, such that the coolant may not flow in the cooling line 220.

Meanwhile, the coolant in the coolant circulation line 200 is circulated by the operations of the second pump 232, the fourth pump 252, and the first pump 214. Further, the coolant may be heated while passing through the condenser 120, heated by the coolant heater 233, and heated by waste heat of the electrical component 253 and the battery 213. The coolant may be cooled while passing through the chiller 160.

In this case, the second direction switching valve 231 and the first direction switching valve 212 may adjust the directions thereof so that the heating line 230 and the refrigerating line 210 are separated. More specifically, the coolant may flow as the upper side and the right side of the second direction switching valve 231 are connected to each other, and the coolant may flow as the lower side and the left side of the second direction switching valve 231 are connected to each other. Further, when the right side and the lower side of the first direction switching valve 212 are connected to each other, the coolant may flow, and the left side of the first direction switching valve 212 may be disconnected.

Therefore, the coolant in the heating line 230 sequentially passes through the second pump 232, the coolant heater 233, the heater core 234, the second direction switching valve 231, and the condenser 120, flows into the second pump 232 again, and circulates. This cycle is repeated.

Further, the coolant in the refrigerating line 210 separated from the heating line 230 flows from the fourth pump 252 to the second direction switching valve 231, the electrical component 253, the second coolant joint 262, and the third direction switching valve 215. All the upper side, the left side, and the right side of the third direction switching valve 215 may be connected.

In this case, the right line of the fourth direction switching valve 261 may be closed, thereby preventing the coolant from flowing to the fourth connection line 280.

The refrigerant circulating through the first pump 214 flows to the third direction switching valve 215 via the battery 213, merges with the refrigerant having passed through the electrical component 253, and then flows to the chiller 160. The coolant cooled in the chiller 160 is divided in the first coolant joint 271 and then flows.

The embodiment has been described in which the coolant is cooled by the water-cooled evaporator 140 as a cooling source and then the vehicle interior is cooled by the cabin cooler 222. However, as another embodiment, it is possible to apply a general air conditioner structure in which the evaporator 140 directly exchanges heat with air, and the cooled air flows into the vehicle interior. As a result, the present invention may be applied to the structure of the embodiment in which the cabin cooler 222 and the coolant line through which the coolant flows between the cabin cooler 222 and the water-cooled evaporator 140 are eliminated.

The embodiment of the present invention has been specifically described above with reference to the accompanying drawings.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

The invention claimed is:

1. A vehicle heat pump system comprising:

a compressor configured to compress and circulate a refrigerant;

a first heat exchanger configured to condense the compressed refrigerant;

a first expansion valve configured to expand the condensed refrigerant;

a second heat exchanger configured to evaporate the refrigerant expanded by the first expansion valve by allowing the refrigerant to exchange heat with a coolant;

a cabin cooler configured to cool a vehicle interior by allowing the coolant having passed through the second heat exchanger to exchange heat with air;

a heat-dissipation heat exchanger configured to allow the coolant for cooling an electrical component to exchange heat with outside air, a refrigerant circulation line in which the compressor, the first heat exchanger, the second heat exchanger, and a chiller are disposed and the refrigerant circulates;

a refrigerating line configured to cool a heat generating component by circulating the coolant that exchanges heat with air or the refrigerant;

a cooling line in which the cabin cooler is disposed, the cooling line being configured to cool the vehicle interior by using the coolant passing through the second heat exchanger; and a cooling connection line configured to connect the cooling line and the refrigerating line, wherein the coolant having passed through the heat-dissipation heat exchanger flows into the second heat exchanger in a heating mode; and wherein the refrigerating line and the cooling line are connected by a first direction switching valve, and the refrigerating line and the cooling line are separated and connected depending on an air conditioning mode.

2. The vehicle heat pump system of claim 1, wherein one side of the cooling connection line is disposed between the second heat exchanger and the cabin cooler.

3. The vehicle heat pump system of claim 1, further comprising:

a heating line configured to heat the vehicle interior by circulating the coolant that exchanges heat with the refrigerant through the first heat exchanger.

4. The vehicle heat pump system of claim 3, comprising:

a first connection line branching off from one side of the refrigerating line and connected to the heating line; and a second connection line branching off from the other side of the refrigerating line and connected to the heating line.

5. The vehicle heat pump system of claim 4, wherein the first connection line, the second connection line, and the heating line are connected to a second direction switching valve, and the refrigerating line and the heating line are connected to or disconnected from each other by the second direction switching valve.

6. The vehicle heat pump system of claim 5, wherein a third connection line branching off from a first coolant joint disposed in the refrigerating line is disposed to pass through the chiller, and a third direction switching valve connected to the refrigerating line is disposed in the third connection line.

7. The vehicle heat pump system of claim 6, wherein the third connection line is disposed in parallel with the refrigerating line in which the heat generating component is disposed.

8. The vehicle heat pump system of claim 6, wherein the heat generating component is disposed in the third connection line, a fourth connection line is disposed between the heat generating component and the chiller, one side of the fourth connection line is connected to the second connection line, the other side of the fourth connection line is connected to the third connection line, and a fourth direction switching valve is disposed in a region in which the second connection line and the fourth connection line are connected.

* * * * *